US007637670B2

(12) United States Patent
Oishi

(10) Patent No.: US 7,637,670 B2

(45) Date of Patent: Dec. 29, 2009

(54) THRUST ROLLER BEARING

(75) Inventor: Shinji Oishi, Iwata (JP)

(73) Assignee: NTN Corporation, Osaka (JP)

( * ) Notice: Subject to any disclaimer, the term of this patent is extended or adjusted under 35 U.S.C. 154(b) by 396 days.

(21) Appl. No.: 11/332,627

(22) Filed: Jan. 17, 2006

(65) Prior Publication Data

US 2006/0159380 A1 Jul. 20, 2006

(30) Foreign Application Priority Data

Jan. 19, 2005 (JP) ............................ 2005-011999
Jan. 20, 2005 (JP) ............................ 2005-013266
Jan. 20, 2005 (JP) ............................ 2005-013267
Jan. 20, 2005 (JP) ............................ 2005-013268
Jan. 28, 2005 (JP) ............................ 2005-021981
Jan. 28, 2005 (JP) ............................ 2005-021982

(51) Int. Cl.
*F16C 33/46* (2006.01)

(52) U.S. Cl. ...................................................... 384/623

(58) Field of Classification Search ................. 384/580, 384/621, 623
See application file for complete search history.

(56) References Cited

U.S. PATENT DOCUMENTS 1,330,158 A * 2/1920 Arnold ....................... 384/614
3,240,542 A * 3/1966 Jahn ........................... 384/623
3,802,754 A * 4/1974 Pitner ......................... 384/580
5,647,674 A * 7/1997 Ohashi et al. ............... 384/580
6,039,475 A * 3/2000 Furukawa et al. ........... 384/580
6,106,158 A * 8/2000 Hayashi et al. ............. 384/623

FOREIGN PATENT DOCUMENTS

JP 50-52351 5/1975
JP 7-151153 6/1995
JP 9-236130 9/1997
JP 10-2337 1/1998
JP 11-336751 12/1999
JP 2000-192965 7/2000
JP 2002-181052 6/2002
JP 2004-156724 6/2004
JP 2004-316930 11/2004

* cited by examiner

*Primary Examiner*—Thomas R Hannon
(74) *Attorney, Agent, or Firm*—Clark & Brody

(57) ABSTRACT

A cage of a thrust roller bearing is formed of an annular plate material and has a plurality of pockets to house rollers on surface which intersect with a bearing rotation axis. A first roller contact part comprising a first roller stopper to prevent the roller from escaping upward and a first roller guide surface to guide a roller rotation on its processed surface, and a second roller contact part comprising a second roller stopper to prevent the roller from escaping downward and a second roller guide surface to guide the roller rotation on its processed surface are provided on a wall surface of the pocket opposed to an outer periphery of the roller. In addition, a non-contact part retreating from the roller contact part is provided.

4 Claims, 18 Drawing Sheets

41 44 E 42 46 44a 44b 46 42 47 45b 45a 42 45b 45a 45 E' 45 43

THRUST ROLLER BEARING

BACKGROUND OF THE INVENTION

1. Field of the Invention

The present invention relates to a thrust roller bearing used in an automatic transmission, a compressor or the like.

In addition, the present invention relates to a compressor used in a cooling cycle of a car air-conditioner and more particularly, to a rotating shaft supporting structure of a compressor comprising a rotating shaft and a thrust roller bearing supporting thrust load generated by a rotation of the rotating shaft.

In addition, the present invention relates to an automatic transmission and more particularly, to a rotating shaft supporting structure of an automatic transmission comprising a thrust roller bearing supporting thrust load generated by either rotation of an input shaft or an output shaft.

Furthermore, the present invention relates to a continuously variable transmission and more particularly, to a rotating shaft supporting structure of a continuously variable transmission comprising a thrust roller bearing supporting thrust load generated by either rotation of an input shaft or an output shaft.

2. Description of the Background Art

A compressor used in a car air-conditioner and the like is disclosed in Japanese Unexamined Patent Publication No. 2004-316930, for example.

According to the above document, as shown in FIG. 19, a compressor 51 used in a car air-conditioner and the like comprises an input rotating shaft 52, a double-side swash plate 53 titled at a predetermined angle from a surface intersecting with a rotation axis of the input rotating shaft 52 at right angles, and a piston 54 reciprocated by a rotation of the double-side swash plate 53.

Since the double-side swash plate 53 receives thrust load generated by the rotation of the input rotating shaft 52 in the compressor 51, it is supported by a thrust roller bearing 55 provided on both sides of the double-side swash plate 53.

In addition, other types of compressors used in the car air-conditioner includes a single-side swash plate type compressor 61 in which a piston 65 is reciprocated by a single-side swash plate 63 fixed to an input rotating shaft 62 through a rod 64 shown in FIG. 20, or a variable capacity single-side swash plate type compressor 71 in which a piston 75 is reciprocated by a swash plate 73 mounted on an input rotating shaft 72 at a variable angle through a rod 74 shown in FIG. 21.

According to the above compressors 61 and 71 also, since the swash plates 63 and 73 receive thrust load by the rotation of the input rotating shafts 62 and 72, the swash plates 63 and 73 are supported by the thrust roller bearings 66 and 76, respectively.

An automatic transmission used in a car and the like is disclosed in Japanese Unexamined Patent Publication No. 2004-156724, for example. According to this document, the automatic transmission comprises a torque converter 100 and a planet gear mechanism (not shown) as shown in FIG. 22 in general. The torque converter 100 mainly comprises an impeller 101, a stator 102 and a turbine 103.

According to the torque converter 100, the impeller 101 coupled to an output shaft of an engine and the turbine 103 coupled to an input shaft of the transmission are arranged so as to be opposed to each other. In addition, the stator 102 is mounted on a stator shaft fixed to a ceasing through one-way clutch 104.

When fluid flowing between an impeller blade 101*a* and a turbine blade 103*a* both of which are saucer-shaped, is returned from the turbine 103 to the impeller 101 on the side of an inner diameter thereof, the stator 102 changes a flowing direction of the fluid and applies forward rotation force to the impeller 101 to amplify transmission torque.

According to the above automatic transmission, since thrust load is generated by either rotation of the input shaft or the output shaft, the thrust roller bearing 111 is provided between the impeller 101 and the stator 102, and between the stator 102 and the turbine 103.

A continuous variable transmission used as a transmission of a car and the like is disclosed in Japanese Unexamined Patent Publication No. 2004-316930, for example.

According to this document, the continuous variable transmission used as the transmission of the car and the like comprises an input shaft 201, an output shaft 203, a drive shaft 201*a*, a continuous variable transmission mechanism 200 to vary a speed of the rotation of the input shaft 201 and transmit it to the output shaft 203, and a forward/backward movement changeover mechanism 210 to switch forward and backward movements of the input shaft 201 as shown in FIG. 23.

The continuously variable transmission 200 comprises a first pulley 202 provided for the input shaft 201, a second pulley 204 provided for the output shaft 203, and a belt 205 provided around both first pulley 202 and the second pulley 204.

The first and second pulleys 202 and 204 comprise fixed pulleys 202*a* and 204*a* fixed to the input shaft 201 and the output shaft 203, and movable pulleys 202*b* and 204*b* slidably retained by a ball spline (not shown) and the like in the direction of the shaft, respectively.

When the movable pulleys 202*b* and 204*b* are moved in the shaft direction, since groove widths of the pulleys 202 and 204 are varied, a wound diameter of the belt 205 for the pulleys 202 and the pulley 204 is continuously varied. As a result, a rotation speed of the input shaft is continuously varied and transmitted to the output shaft 203.

The forward/backward changeover mechanism 210 comprises an internal gear 213*a* rotated along with the rotation of the drive shaft 201*a*, a sun gear 201*b* rotated along with the rotation of the input shaft 201, a planet pinion 212*a* engaging with the internal gear 213*a* and the sun gear 201*b*, and multiplate clutches 215 and 216.

When the forward/backward changeover mechanism 210 connects the multiplate clutch 216, the rotation of the drive shaft 201*a* is transmitted to the input shaft 201 in a forward direction. Meanwhile, when it connects the multiplate clutch 215, the rotation of the drive shaft 201*a* is transmitted to the input shaft 201 in a backward direction.

According to such continuously variable transmission, since thrust load is generated by the rotation of the rotating shaft, thrust roller bearings 220 are provided between the roller bearing 211 and a supporting member 212 which support the input shaft 201, between the supporting member 212 and the sun gear 201*b*, between the sun gear 201*b* and the supporting member 213, and between the supporting member 213 and a housing 206 as shown in FIG. 24.

The bearing supporting the rotating shaft of the automatic transmission of the car, the bearing supporting the swash plate of the compressor used in the car air-conditioner, and the bearing supporting the rotating shaft of the continuously variable transmission are described in Japanese Unexamined Patent Publication No. 2000-192965, for example. A thrust roller bearing described in this document comprises rollers and a cage 1 having a plurality of pockets 2 to hold the rollers on an annular periphery as shown in FIG. 1 or further comprises a bearing ring.

Referring to a sectional view taken along line A-A' in FIG. 2, an annular plate material is pressed to have a W-shaped configuration and the pockets 2 are formed by blanking. When the pocket 2 is formed by blanking, a plurality of roller stoppers 3 to prevent a roller 5 from escaping and a roller guide surface 4 to guide a rotation of the roller 5 are formed therein.

The roller stoppers 3 are adjacently positioned in a bearing rotation axis direction and a roller rotation axis direction. Referring to FIG. 2, the roller stoppers 3 are formed at the central upper part and at lower both ends of the pocket 2. In addition, the roller guide surface 4 is provided at a tilted part between the adjacent roller stoppers 3.

Here, the bearing rotation axis is a virtual axis passing through the center of an orbit of the rollers when the bearing is rotated, and the roller rotation axis is a virtual axis passing through the center of each roller when the bearing is rotated.

As shown in FIG. 3, the roller stopper 3 protrudes from a wall surface of the pocket 2 to prevent the roller 5 from escaping when the thrust roller bearing is stopped. Meanwhile, as shown in FIG. 4, the roller 5 is not in contact with the roller stopper 3 with play do between them and rotated with the guide of the roller guide surface 4 when the thrust roller bearing is rotated.

According to the above thrust roller bearing, since the roller comes in contact with a raceway surface linearly, high load capacity and high rigidity can be ensured despite a small bearing projected area.

Recently, since the car automatic transmission, the compressor of the car air-conditioner, the continuously variable transmission and the like have been increasingly reduced in size, there is a great demand for reducing a thickness of the thrust roller bearing in the bearing axis direction accordingly.

When the thrust roller bearing shown in FIG. 4 is reduced in size in general, a roller diameter, a thickness of a W-shaped cage, a plate thickness of the W-shaped cage are reduced according to a predetermined ratio such that $\phi_0>\phi_1$, $w_0>w_1$, and $t_0>t_1$.

However, in order to maintain strength of the W-shaped cage, the plate thickness "$t_1$" of the W-shaped cage cannot be reduced so much.

According to the thrust roller bearing used in the automatic transmission, both bearing rings are eccentrically rotated to each other just after an engine is started and the cage could be sandwiched between both bearing rings. Therefore, when the plate thickness "$t_1$" of the cage is reduced, the cage could be damaged.

Thus, as shown in FIG. 5B, when the plate thickness "$t_2$" is set such that $t_1<t_2$, without changing the roller diameter "$\phi_1$" and the thickness "$W_1$" of the W-shaped cage, the play "$d_2$" has to be reduced in order to prevent the roller 5 from escaping. When the play "$d_2$" becomes small, lubrication oil on an outer periphery of the roller 5 is scraped off by the roller stopper 3, which causes a rotation defect.

In addition, when the projecting amount of the roller stopper 3 from the end face of the pocket 2 and an opening is enlarged in order to ensure appropriate play, the roller 5 cannot be prevented from escaping.

Meanwhile, as shown in FIG. 5C, when a plate thickness "$t_3$" is set such that $t_1>t_3$, although the play "$d_3$" can be provided enough, the strength of the cage is further lowered.

In addition, as a conventional problem, since the roller guide surface 4 is formed by blanking, a part of the roller guide surface 4 has a fracture surface. As a result, contact resistance between the roller guide surface 4 having a rough surface and the roller 5 is increased, iron powder due to abrasion is generated. In addition, under severe lubrication circumstances, the bearing could be damaged because of a lubrication defect such as a cut of an oil film.

SUMMARY OF THE INVENTION

It is an object of the present invention to provide a durable thrust roller bearing by providing a sufficient plate thickness to maintain strength of a cage and providing some appropriate play between a roller and a roller stopper.

It is another object of the present invention to provide a rotating shaft supporting structure of a compressor comprising a durable thrust roller bearing by ensuring a sufficient plate thickness to maintain strength of a cage and providing some appropriate play between a roller and a roller stopper even when a thickness of the thrust roller bearing is reduced.

It is still another object to provide a rotating shaft supporting structure of an automatic transmission comprising a durable thrust roller bearing by providing a sufficient plate thickness to maintain strength of a cage and providing some appropriate play between a roller and a roller stopper even when a thickness of the thrust roller bearing is reduced.

It is still another object to provide a rotating shaft supporting structure of a continuously variable transmission comprising a durable thrust roller bearing by providing a sufficient plate thickness to maintain strength of a cage and providing some appropriate play between a roller and a roller stopper even when a thickness of the thrust roller bearing is reduced.

According to one aspect of the present invention, a thrust roller bearing comprises rollers, and a cage which is formed of an annular member and has a plurality of pockets to house the rollers on surfaces which intersect with a bearing rotation axis, and a first roller contact part and a second roller contact part are provided on a wall surface of the pocket opposed to an outer periphery of the roller so as to be adjacently positioned in a direction of the bearing rotation axis and in a direction of a rotation axis of the roller.

It is characterized in that the first roller contact part comprises a first roller stopper to prevent the roller from escaping in one direction and a first roller guide surface to guide a rotation of the roller, and the second roller contact part comprises a second roller stopper to prevent the roller from escaping in the other direction and a second roller guide surface to guide the rotation of the roller.

In the above constitution, some appropriate play between the roller and the roller stopper can be provided without reducing a plate thickness of the cage. As a result, the strength of the cage and a lubrication property of the thrust roller bearing are prevented from being lowered.

Preferably, the roller stopper and the roller guide surface are formed such that a corner of the roller contact part on a roller contact side is formed by surface pressing. Thus, since the roller guide surface can be smooth, contact resistance between the roller guide surface and the roller is lowered and iron powder due to abrasion can be prevented from being generated. In addition, even under severe lubrication circumstances, an oil film is not cut, so that a high lubrication property can be maintained. As a result, the thrust roller bearing has excellent durability and a quiet property.

In addition, the surface pressing in this specification refers to a process in which a surface to be processed is formed into a desired shape by plastic processing. According to this process, the surface becomes smooth and various kinds of shapes can be formed depending on a configuration of a processing tool.

Preferably, a non-contact part retreating from the roller guide surface is provided between the first roller contact part and the second roller contact part. Thus, since a distance between the roller and the cage is increased, an oil-passing property is improved. As a result, the thrust roller bearing provides an excellent lubrication property.

According to the present invention, even in the thrust roller bearing having a small roller diameter, some appropriate play between the roller and the roller stopper can be provided without reducing the plate thickness of the cage. As a result, the strength of the cage is maintained while the lubrication property of the thrust roller bearing is prevented from being lowered.

In addition, since the roller guide surface is smooth and a part which is not in contact with the cage is provided, the thrust roller bearing provides excellent durability and a quiet property.

According to another aspect of the present invention, a thrust roller bearing comprises rollers and a cage which is formed of an annular member having one surface and the other surface and has a plurality of pockets to house the rollers on surfaces which intersect with a bearing rotation axis, and ring-shaped grooves each having a reduced plate thickness are formed on one surface and the other surface of the cage.

A first roller contact part and a second roller contact part are provided on a wall surface of the pocket opposed to an outer periphery of the roller so as to be adjacently positioned in a direction of the bearing rotation axis and in a direction of a rotation axis of the roller.

The first roller contact part comprises a first roller stopper to prevent the roller from escaping in one direction and a first roller guide surface to guide a rotation of the roller, and the second roller contact part comprises a second roller stopper to prevent the roller from escaping in the other direction and a second roller guide surface to guide the rotation of the roller.

According to the above constitution, the plate thickness of the cage can be as thick as the thickness of the cage. As a result, the cage has great strength as compared with the conventional cage. In addition, since a size of the roller stopper is regardless of the plate thickness of the cage and some play between the roller and the roller stopper can be appropriately provided, a lubrication property of the thrust roller bearing can be prevented from being lowered.

Preferably, the roller stopper and the roller guide surface of each roller contact part are formed by burnishing. Thus, since a smooth roller guide surface can be provided, contact resistance between the guide surface and the roller is lowered and iron powder due to abrasion can be prevented from being generated. In addition, under severe lubrication circumstances, an oil film is not cut and a high lubrication property is provided.

As a result, the thrust roller bearing has excellent durability and a quiet property. In addition, the burnishing in this specification refers to a process in which a tool is pressed to make a surface smooth.

Preferably, the ring-shaped groove of the cage is formed by coining. Thus, as compared with a case it is formed by bending, the strength of the cage is great and the cage is hardly deformed due to processing or a heat treatment. In addition, even when it is deformed, it can be corrected by press tempering.

In addition, the coining in this specification refers to a process of cold forging to form indents in a surface by pressing from above and beneath. In addition, the press tempering refers to a process to correct deformation such as bending by pressing at the time of tempering.

Preferably, a non-contact part retreating from the roller guide surface is provided between the first roller contact part and the second roller contact part. Thus, a distance between the roller and the cage is increased, an oil-passing property of the bearing can be improved. As a result, the thrust roller bearing provides an excellent lubrication property.

According to the present invention, even in the thrust roller bearing having a small roller diameter, some appropriate play between the roller and the roller stopper can be provided without reducing the plate thickness of the cage. As a result, the strength of the cage is maintained while the lubrication property of the thrust roller bearing is prevented from being lowered.

According to still another aspect of the present invention, a thrust roller bearing comprises rollers and a cage which is formed of an annular member and has a plurality of pockets to house the rollers on surfaces which intersect with a bearing rotation axis.

In addition, a first roller contact part and a second roller contact part are provided on a wall surface of the pocket opposed to an outer periphery of the roller so as to be adjacently positioned in a direction of the bearing rotation axis and in a direction of a rotation axis of the roller.

Furthermore, a relation between a plate thickness "t" of the cage and a roller diameter "$\phi$" is such that $t/\phi \geqq 0.2$, and the roller diameter "$\phi$" is not more than 2 mm.

According to the above constitution, even when the thickness of the thrust roller bearing is reduced along with compactification of the automatic transmission or the compressor, excellent strength can be provided.

According to still another aspect of the present invention, a thrust roller bearing comprises rollers and a cage which is formed of an annular member having one surface and the other surface and has a plurality of pockets to house the rollers on surfaces which intersect with a bearing rotation axis, and ring-shaped grooves each having a reduced plate thickness are formed on one surface and the other surface of the cage.

In addition, a first roller contact part and a second roller contact part are provided on a wall surface of the pocket opposed to an outer periphery of the roller so as to be adjacently positioned in a direction of the bearing rotation axis and in a direction of a rotation axis of the roller.

Furthermore, a relation between a plate thickness "t" of the cage and a roller diameter "$\phi$" is such that $t/\phi \geqq 0.6$, and the roller diameter "$\phi$" is not more than 2 mm.

According to the above constitution, the plate thickness of the cage can be as thick as the thickness of the cage. As a result, the cage has great strength as compared with the conventional cage.

However, when the plate thickness "t" is reduced, the play between the roller and the roller contact part becomes small, so that the lubrication oil on the outer periphery of the roller is scraped off by the roller contact part, and the rotation defect could be caused. Thus, when the relation between the plate thickness "t" of the cage roller and the roller diameter "$\phi$" is such that $t/\phi \geqq 0.6$ in the thrust roller bearing having a roller diameter "$\phi$" of 2 mm or less, the above problem can be avoided.

Preferably, the ring-shaped groove of the cage is formed by coining. Thus, as compared with a case it is formed by bending, the strength of the cage is great and the cage is hardly deformed due to processing or a heat treatment. In addition, even when it is deformed, it can be corrected by press tempering.

According to the present invention, some appropriate play between the roller and the roller stopper can be provided in the thrust roller bearing having a small roller diameter of 2 mm or less, and a plate thickness required to maintain the strength of the cage is ensured. As a result, the thrust roller bearing provides excellent durability According to still another aspect of the present invention, a rotating shaft supporting structure of a compressor comprising a rotating shaft, and a thrust roller bearing supporting thrust load generated by a rotation of the rotating shaft.

The thrust roller bearing comprises rollers and a cage which is formed of an annular member and has a plurality of pockets to house the rollers on surfaces which intersect with a bearing rotation axis.

A first roller contact part and a second roller contact part are provided on a wall surface of the pocket opposed to an outer periphery of the roller so as to be adjacently positioned in a direction of the bearing rotation axis and in a direction of a rotation axis of the roller.

A first roller stopper to prevent the roller from escaping in one direction is formed in the first roller contact part in such a manner that a corner on a roller contact side is formed by surface pressing, and a second roller stopper to prevent the roller from escaping in the other direction is formed in the second roller contact part in such a manner that a corner on a roller contact side is formed by surface pressing.

According to the above constitution, some appropriate play between the roller and the roller stopper can be provided without reducing the plate thickness of the cage. As a result, the rotating shaft supporting structure of the compressor comprises the thrust roller bearing having a high lubrication property and the strong cage.

Preferably, a relation between a plate thickness "t" of the cage and a roller diameter "$\phi$" is such that $t/\phi \geqq 0.2$, and the roller diameter "$\phi$" is not more than 2 mm.

According to the above constitution, even when the thickness of the thrust roller bearing is reduced along with compactification of the compressor used in the car air-conditioner and the like, excellent strength can be provided.

According to still another aspect of the present invention, a rotating shaft supporting structure of a compressor comprises a rotating shaft and a thrust roller bearing supporting thrust load generated by a rotation of the rotating shaft.

The thrust roller bearing comprises rollers and a cage which is formed of an annular member having one surface and the other surface and has a plurality of pockets to house the rollers on surfaces which intersect with a bearing rotation axis, and ring-shaped grooves each having a reduced plate thickness are formed in one surface and the other surface of the cage.

A first roller contact part and a second roller contact part are provided on a wall surface of the pocket opposed to an outer periphery of the roller so as to be adjacently positioned in a direction of the bearing rotation axis and in a direction of a rotation axis of the roller.

According to the above constitution, the plate thickness of the cage can be as thick as the thickness of the cage. As a result, the cage has great strength as compared with the conventional cage.

In addition, since a size of the roller stopper can be freely decided within a range of the plate thickness of the cage, a plate thickness required to maintain the strength of the cage can be ensured and some play between the roller and the roller stopper can be appropriately provided. As a result, the rotating shaft supporting structure of the compressor comprises the durable thrust roller bearing.

Preferably, a relation between a plate thickness "t" of the cage and a roller diameter "$\phi$" is such that $t/\phi \geqq 0.6$, and the roller diameter "$\phi$" is not more than 2 mm. According to the above constitution, the plate thickness "t" of the cage can be as thick as the thickness of the cage. As a result, the cage has great strength as compared with the conventional cage.

However, when the plate thickness "t" is reduced, the play between the roller and the roller contact part becomes small, so that lubrication oil on the outer periphery of the roller is scraped off by the roller contact part, and the rotation defect could be caused. Thus, when the relation between the plate thickness "t" of the cage roller and the roller diameter "$\phi$" is such that $t/\phi \geqq 0.6$ in the thrust roller bearing having a roller diameter "$\phi$" of 2 mm or less, the above problem can be avoided.

According to the present invention, even when the thickness of the thrust roller bearing is reduced, since a plate thickness required to maintain the strength of the cage can be ensured and some appropriate play between the roller and the roller stopper can be provided, the rotating shaft supporting structure of the compressor comprises the durable thrust roller bearing.

According to still another aspect of the present invention, a rotating shaft supporting structure of an automatic transmission which varies a rotation of an input shaft in stages and transmits it to an output shaft and comprises a thrust roller bearing supporting thrust load generated by either rotation of the input shaft or the output shaft.

The thrust roller bearing comprises rollers and a cage which is formed of an annular member and has a plurality of pockets to house the rollers on surfaces which intersect with a bearing rotation axis.

A first roller contact part and a second roller contact part are provided on a wall surface of the pocket opposed to an outer periphery of the roller so as to be adjacently positioned in a direction of the bearing rotation axis and in a direction of a rotation axis of the roller. A first roller stopper to prevent the roller from escaping in one direction is formed in the first roller contact part in such a manner that a corner on a roller contact side is formed by surface pressing, and a second roller stopper to prevent the roller from escaping in the other direction is formed in the second roller contact part in such a manner that a corner on a roller contact side is formed by surface pressing.

According to the above constitution, some appropriate play between the roller and the roller stopper can be provided without reducing the plate thickness of the cage. As a result, the rotating shaft supporting structure of the automatic transmission comprises the thrust roller bearing having a high lubrication property and the strong cage.

Preferably, a relation between a plate thickness "t" of the cage and a roller diameter "$\phi$" is such that $t/\phi \geqq 0.2$, and the roller diameter "$\phi$" is not more than 2 mm.

According to the above constitution, even when the thickness of the thrust roller bearing is reduced along with compactification of the automatic transmission used in a car and the like, great strength can be maintained.

According to still another aspect of the present invention, a rotating shaft supporting structure of an automatic transmission which varies a rotation of an input shaft in stages and transmits it to an output shaft comprises a rotating shaft and a thrust roller bearing supporting thrust load generated by either rotation of the input shaft or the output shaft.

The thrust roller bearing comprises rollers and a cage which is formed of an annular member having one surface and the other surface and has a plurality of pockets to house the rollers on surfaces which intersect with a bearing rotation axis, and ring-shaped grooves each having a reduced its plate thickness are formed in one surface and the other surface of the cage.

A first roller contact part and a second roller contact part are provided on a wall surface of the pocket opposed to an outer periphery of the roller so as to be adjacently positioned in a direction of the bearing rotation axis and in a direction of a rotation axis of the roller.

According to the above constitution, a plate thickness of the cage can be as thick as the thickness of the cage. As a result, the cage has great strength as compared with the conventional cage.

In addition, since a size of the roller stopper can be freely decided within a range of the plate thickness of the cage, a plate thickness required to maintain the strength of the cage can be ensured and some play between the roller and the roller stopper can be appropriately provided. As a result, the rotating shaft supporting structure of the automatic transmission comprises the durable thrust roller bearing.

Preferably, a relation between a plate thickness "t" of the cage and a roller diameter "ϕ" is such that $t/\phi \geqq 0.6$, and the roller diameter "ϕ" is not more than 2 mm.

According to the above constitution, the plate thickness of the cage can be as thick as the thickness of the cage. As a result, the cage has great strength as compared with the conventional cage.

However, when the plate thickness "t" is reduced, the play between the roller and the roller contact part becomes small, so that lubrication oil on the outer periphery of the roller is scraped off by the roller contact part, and the rotation defect could be caused. Thus, when the relation between the plate thickness "t" of the cage roller and the roller diameter "ϕ" is such that $t/\phi \geqq 0.6$ in the thrust roller bearing having a roller diameter "ϕ" of 2 mm or less, the above problem can be avoided.

According to the present invention, even when the thickness of the thrust roller bearing is reduced, since a plate thickness required to maintain the strength of the cage can be ensured and some appropriate play between the roller and the roller stopper can be provided, the rotating shaft supporting structure of the automatic transmission comprises the durable thrust roller bearing.

According to still another aspect of the present invention, a rotating shaft supporting structure of a continuously variable transmission which continuously varies a rotation of an input shaft and transmits it to an output shaft and comprises a thrust roller bearing supporting thrust load generated by either rotation of the input shaft or the output shaft.

The thrust roller bearing comprises rollers and a cage which is formed of an annular member and has a plurality of pockets to house the rollers on surfaces which intersect with a bearing rotation axis.

A first roller contact part and a second roller contact part are provided on a wall surface of the pocket opposed to an outer periphery of the roller so as to be adjacently positioned in a direction of the bearing rotation axis and in a direction of a rotation axis of the roller. A first roller stopper to prevent the roller from escaping in one direction is formed in the first roller contact part in such a manner that a corner on a roller contact side is formed by surface pressing, and a second roller stopper to prevent the roller from escaping in the other direction is formed in the second roller contact part in such a manner that a corner on a roller contact side is formed by surface pressing.

According to the above constitution, some appropriate play between the roller and the roller stopper can be provided without reducing the plate thickness of the cage. As a result, the rotating shaft supporting structure of the continuously variable transmission comprises the strong cage and the thrust roller bearing having an excellent lubrication property.

Preferably, a relation between a plate thickness "t" of the cage and a roller diameter "ϕ" is such that $t/\phi \geqq 0.2$, and the roller diameter "ϕ" is not more than 2 mm.

According to the above constitution, even when the thickness of the thrust roller bearing is reduced along with compactification of the continuously variable transmission used as the transmission of the car and the like, great strength can be maintained.

According to still another aspect of the present invention, a rotating shaft supporting structure of a continuously variable transmission which continuously varies a rotation of an input shaft and transmits it to an output shaft and comprises a thrust roller bearing supporting thrust load generated by either rotation of the input shaft or an output shaft.

The thrust roller bearing comprises rollers and a cage which is formed of an annular member having one surface and the other surface and has a plurality of pockets to house the rollers on surfaces which intersect with a bearing rotation axis, and ring-shaped grooves each having a reduced plate thickness are formed in the one surface and the other surface of the cage.

A first roller contact part and a second roller contact part are provided on a wall surface of the pocket opposed to an outer periphery of the roller so as to be adjacently positioned in a direction of the bearing rotation axis and in a direction of a rotation axis of the roller.

According to the above constitution, the plate thickness of the cage can be as thick as the thickness of the cage. As a result, the cage has great strength as compared with the conventional cage.

In addition, since a size of the roller stopper can be freely decided within a range of the plate thickness of the cage, a plate thickness required to maintain the strength of the cage can be ensured and some play between the roller and the roller stopper can be appropriately provided. As a result, the rotating shaft supporting structure of the continuously variable transmission comprises the durable thrust roller bearing.

Preferably, a relation between a plate thickness "t" of the cage and a roller diameter "ϕ" is such that $t/\phi \geqq 0.6$, and the roller diameter "ϕ" is not more than 2 mm.

According to the above constitution, the plate thickness of the cage can be as thick as the thickness of the cage. As a result, the cage has great strength as compared with the conventional cage.

However, when the plate thickness "t" is reduced, the play between the roller and the roller contact part becomes small, so that the lubrication oil on the outer periphery of the roller is scraped off by the roller contact part, and the rotation defect could be caused. Thus, when the relation between the plate thickness "t" of the cage roller and the roller diameter "ϕ" is such that $t/\phi \geqq 0.6$ in the thrust roller bearing having a roller diameter "ϕ" of 2 mm or less, the above problem can be avoided.

According to the present invention, even when the thickness of the thrust roller bearing is reduced, since a plate thickness required to maintain the strength of the cage can be ensured and some appropriate play between the roller and the roller stopper can be provided, the rotating shaft supporting structure of the continuous variable transmission comprises the durable thrust roller bearing.

BRIEF DESCRIPTION OF THE DRAWINGS

FIG. 19 is a schematic sectional view showing a double-side wash plate type compressor according to one embodiment of a compressor used in a car air-conditioner and the like;

FIG. 20 is a schematic sectional view showing a single-side wash plate type compressor according to another embodiment of a compressor used in a car air-conditioner and the like;

FIG. 21 is a schematic sectional view showing a variable capacity wash plate type compressor according to another embodiment of the compressor used in a car air-conditioner and the like;

DESCRIPTION OF THE PREFERRED EMBODIMENTS

Figure 1:
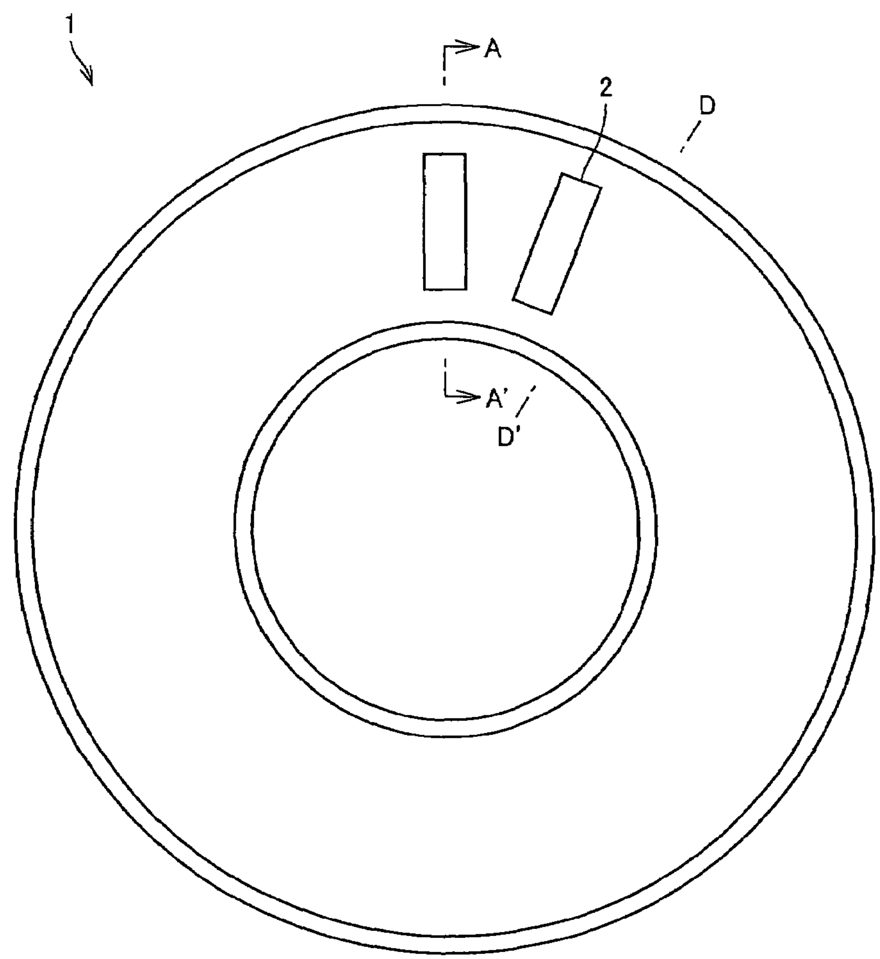
FIG. 1 is a schematic plan view showing a thrust roller bearing cage.
Figure 2:
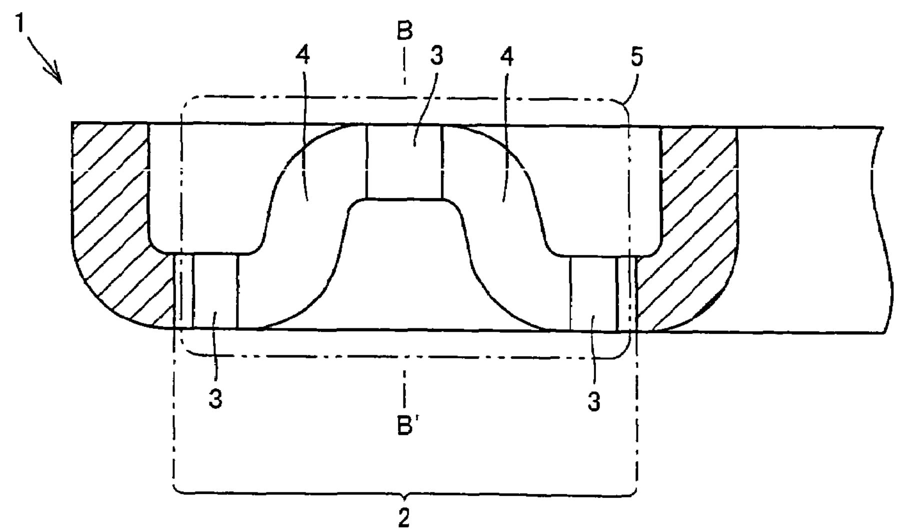
FIG. 2 is a sectional view taken along line A-A' in FIG. 1 and showing a conventional thrust roller bearing cage.
Figure 3:
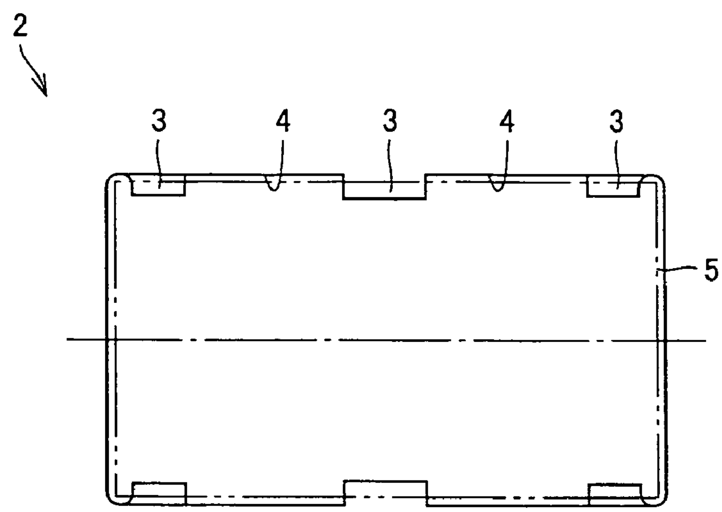
FIG. 3 is a schematic plan view showing a pocket of the conventional thrust roller bearing cage.
Figure 4:
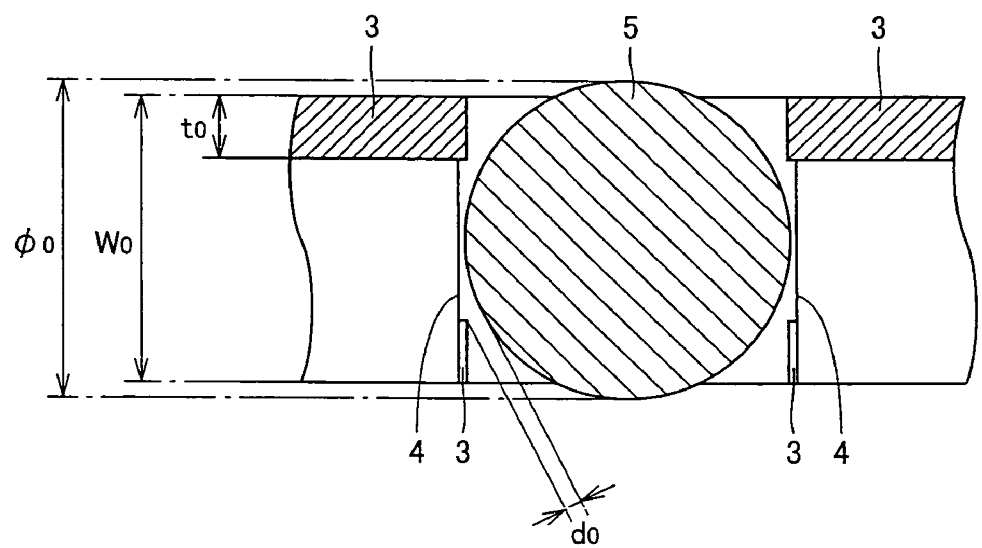
FIG. 4 is a sectional view taken along line B-B' in FIG. 2 and showing the conventional thrust roller bearing cage.
Figure 5A:
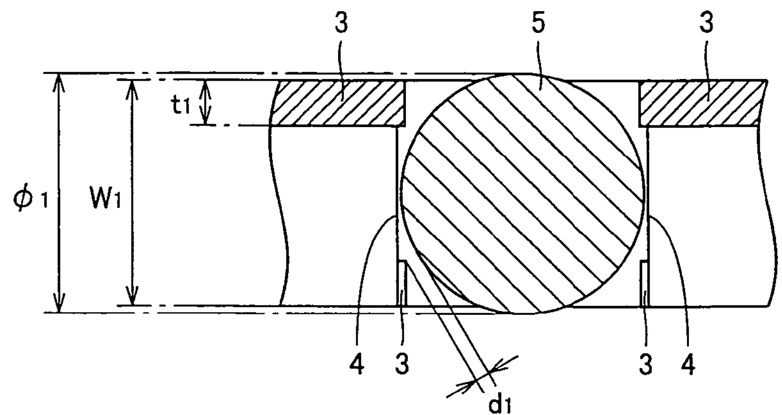
FIG. 5A is a sectional view taken along the line B-B in FIG. 2 and showing a thrust roller bearing cage having a small diameter.
Figure 5B:
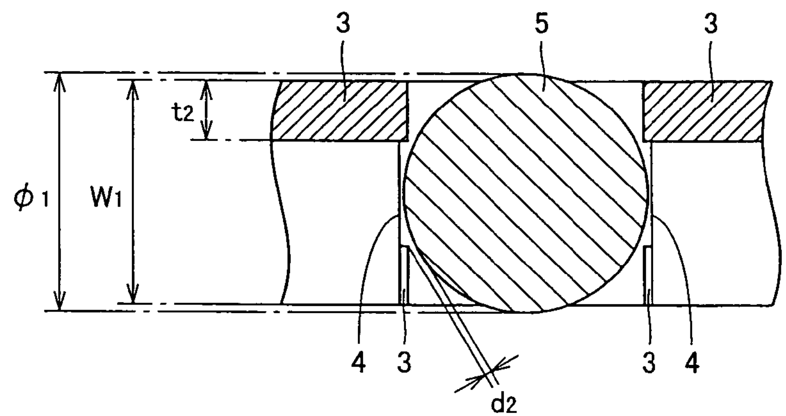
FIG. 5B shows another embodiment of the sectional view taken along the line B-B' in FIG. 2.
Figure 5C:
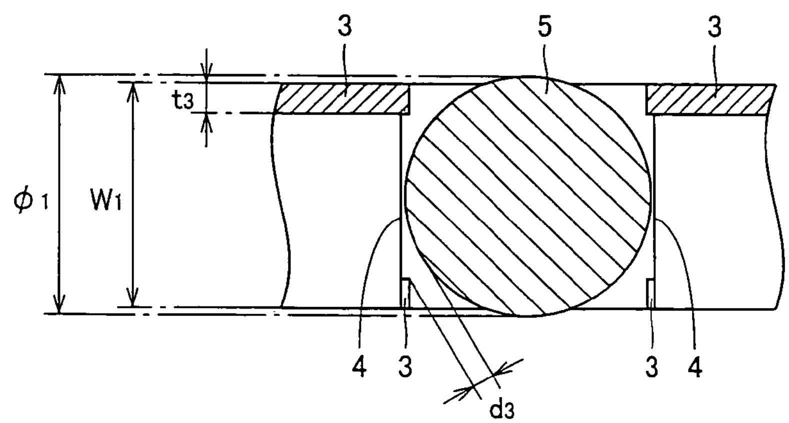
FIG. 5C shows still another embodiment of the sectional view taken along the line B-B' in FIG. 2.
Figure 6:
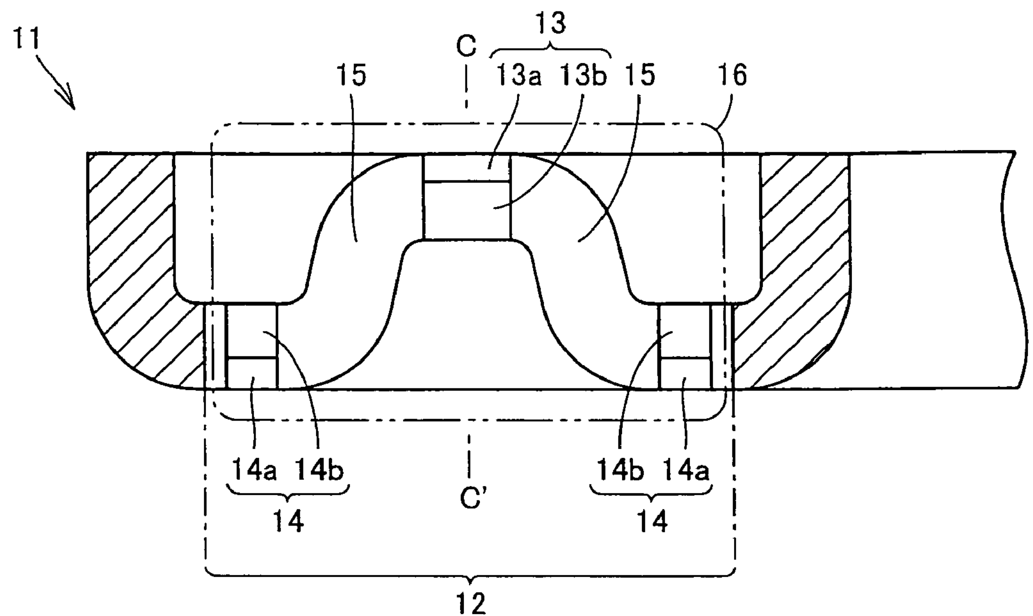
FIG. 6 is a view corresponding to the sectional view taken along the line A-A' in FIG. 1 and showing a thrust roller bearing cage according to one embodiment of the present invention.

One embodiment of a thrust roller bearing according to the present invention will be described with reference to FIGS. 6 to 8 hereinafter. The thrust roller bearing to be described here can be used for supporting thrust load generated by rotation of a rotating shaft of a compressor used in a car air-conditioner and the like, for supporting thrust load generated by rotation of a rotating shaft of an automatic transmission used in a car and the like, or for supporting thrust load generated by rotation of an rotating shaft of a continuously variable transmission used as a transmission in a car and the like.

The thrust roller bearing according to the present invention comprises rollers 16 and a cage 11. As shown in FIG. 6, the cage 11 is a W-shaped cage formed of an annular plate material by pressing, and has a plurality of pockets 12 to house the rollers 16 on surfaces which intersect with a rotation axis of the bearing.

Figure 7:
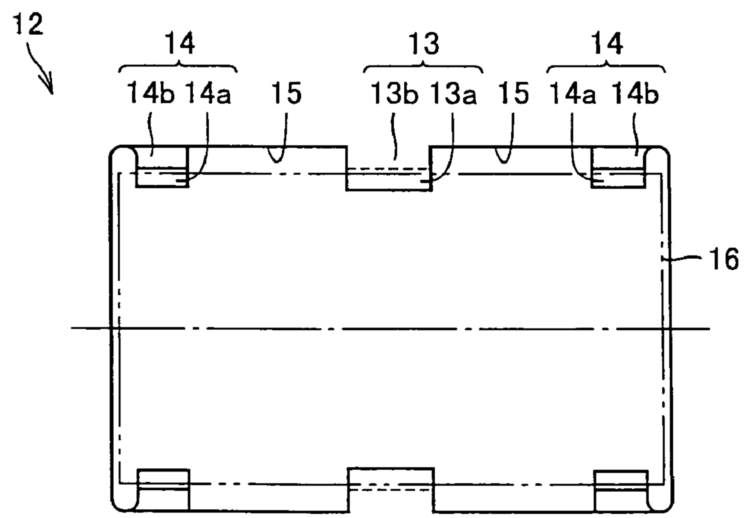
FIG. 7 is a schematic plan view showing a pocket of the thrust roller bearing cage according to one embodiment of the present invention.

As shown in FIG. 7, a wall surface of the pocket 12 comprises roller contact parts 13 and 14 protruding from the wall surface opposed to an outer periphery of the roller 16 and a roller non-contact part 15 retreating from the roller contact parts 13 and 14.

The roller contact parts 13 and 14 are adjacently provided in a direction of a bearing rotation axis and in a direction of a roller rotation axis. According to the embodiment shown in FIG. 6, the first roller contact part 13 is provided at a central upper part of the pocket 12 and the second roller contact parts 14 are provided at lower both ends of the pocket 12.

Figure 8:
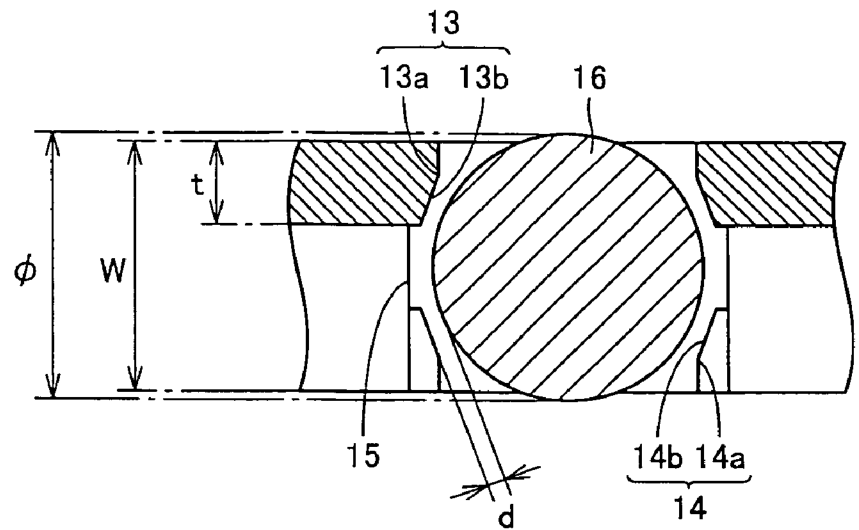
FIG. 8 is a sectional view taken along line C-C' in FIG. 6 and showing the thrust roller bearing cage according to one embodiment of the present invention.

In addition, as shown in FIG. 8, the first roller contact part 13 comprises a first roller stopper 13*a* to prevent the roller 16 from escaping upward and a first roller guide surface 13*b* to guide the rotation of the roller 16 on its processed surface, and the second roller contact part 14 comprises a second roller stopper 14*a* to prevent the roller 16 from escaping downward and a second guide surface 14*b* to guide the rotation of the roller 16 on its processed surface.

According to the cage having the above constitution, a plate thickness "t" required to maintain strength of the bearing can be ensured and appropriate play "d" can be provided by adjusting protruding amounts of the roller stoppers 13*a* and 14*a*. As a result, there can be provided a rotating shaft supporting constitution for the compressor, the automatic transmission, or the continuous variable transmission which comprises a highly durable thrust roller bearing.

A relation between the thickness "t" of the cage and a roller diameter "ϕ" of the roller 16 is such that $t/\phi \geqq 0.2$ and $\phi \geqq 2$ mm.

According to the above constitution, even when the thickness of the thrust roller bearing is reduced along with compactification of the automatic transmission or the compressor, great strength can be provided for the cage.

In addition, since the processed surfaces of the roller contact parts 13 and 14 serve as the roller guide surfaces 13*b* and 14*b*, a cut surface part provided at the time of die-cutting, which has been used for the roller guide surface conventionally, can be used for the non-contact part 15.

Since the non-contact part 15 can largely retreat from the roller contact parts 13*b* and 14*b*, a distance between the non-contact part 15 and the roller 16 can be increased as shown in FIG. 7. As a result, an oil-passing property of the bearing is improved and the thrust roller bearing has a high lubrication property.

Figure 9:
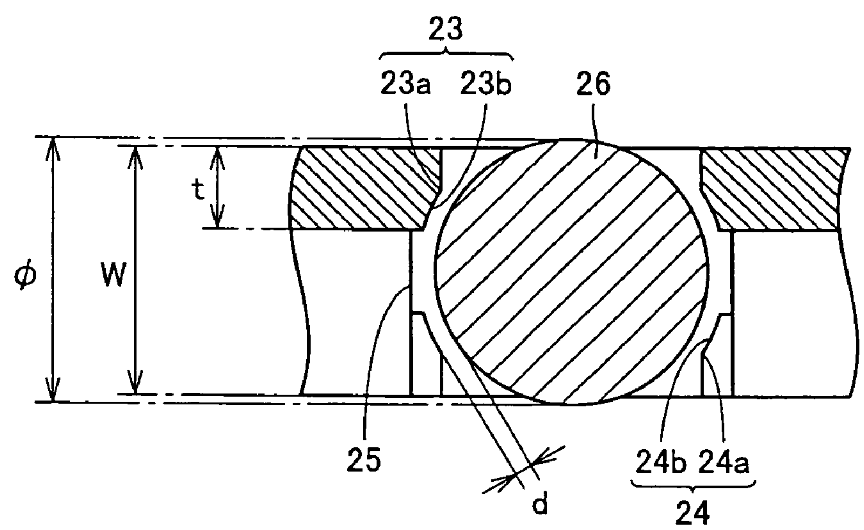
FIG. 9 is a sectional view taken along line C-C' in FIG. 6 and showing the thrust roller bearing cage in which a roller guide surface is curved according to one embodiment of the present invention.
Figure 10:
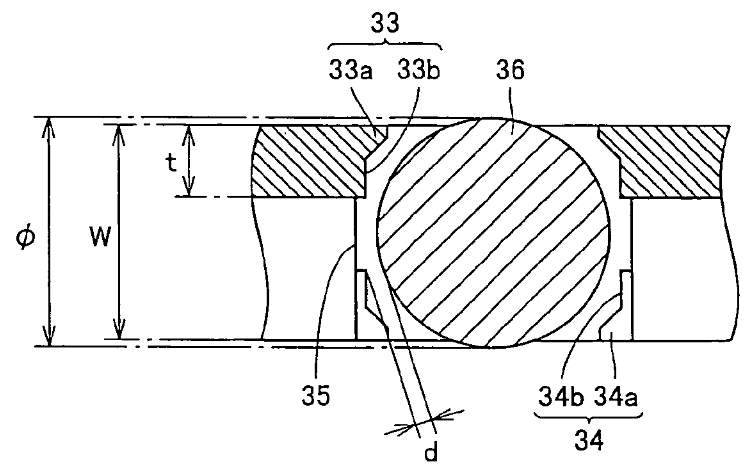
FIG. 10 is a sectional view taken along line C-C' in FIG. 6 and showing the thrust roller bearing cage in which a roller stopper and a roller guide surface are formed by burnishing according to one embodiment of the present invention.

In addition, although the configurations of the roller guide surfaces 13*b* and 14*b* are tapered surfaces in the above embodiment, the present invention is not limited to this, and roller guide surfaces 23*b* and 24*b* may be curved along an outer periphery of a roller 26 as shown in FIG. 9. In addition, as shown in FIG. 10, roller contact parts 33 and 34 comprise roller stoppers 33*a* and 34*a* and roller guide surfaces 33*b* and 34*b*, respectively which are formed by burnishing.

Next, a thrust roller bearing according to another embodiment of the present invention will be described with reference to FIGS. 11 to 14. The thrust roller bearing which will be described here can be used for a rotating shaft supporting structure of a compressor used in a car air-conditioner and the like, for a rotating shaft supporting structure of an automatic transmission used in a car and the like, or for a rotating shaft supporting structure of a continuously variable transmission used as a transmission in a car and the like.

Figure 11:
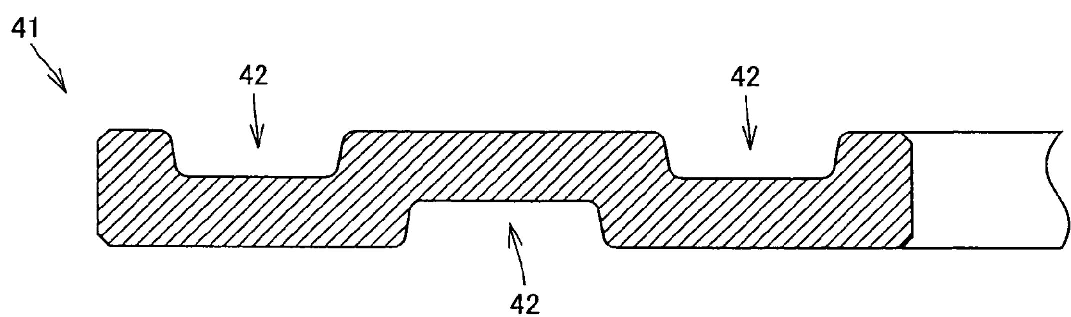
FIG. 11 is a sectional view taken along line D-D' in FIG. 1 and showing a thrust roller bearing cage according to another embodiment of the present invention.

The thrust roller bearing according to the present invention comprises rollers 47 and a cage 41. The cage 41 comprises ring-shaped grooves 42 each having a reduced thickness on both surfaces. According to this embodiment, as shown in FIG. 11, the ring-shaped grooves 42 are provided in the center of a lower surface and at both ends of an upper surface.

Figure 12:
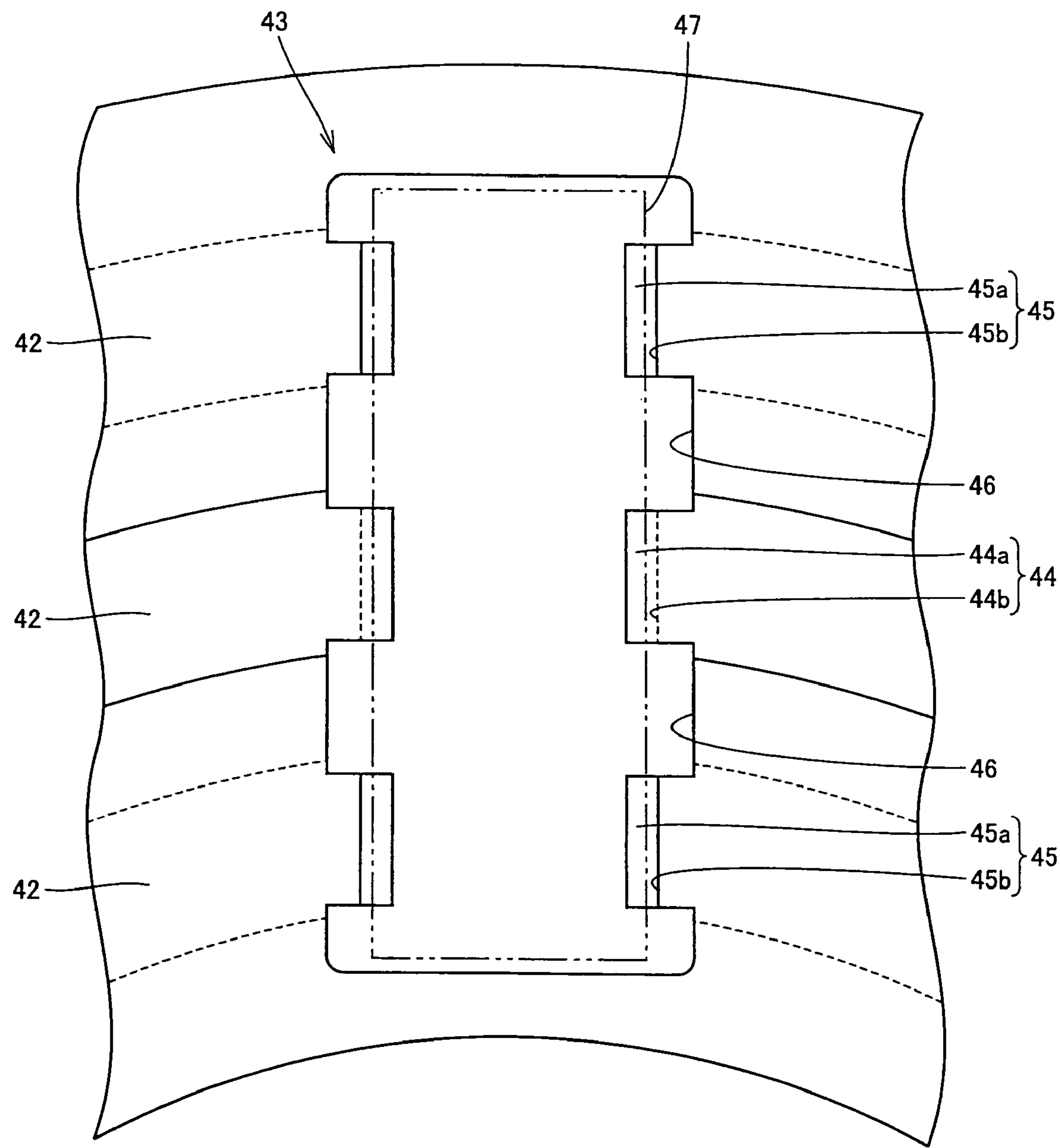
FIG. 12 is a schematic plan view showing a pocket of the thrust roller bearing cage according to another embodiment of the present invention.

In addition, the cage 41 comprises a plurality of pockets 43 shown in FIG. 12, to house rollers 47 on surfaces which intersect with a bearing rotation axis. The pocket 43 comprises roller contact parts 44 and 45 protruding from the wall surface opposed to an outer periphery of the roller 47 and a roller non-contact part 46 retreating from the roller contact parts 44 and 45.

Figure 13:
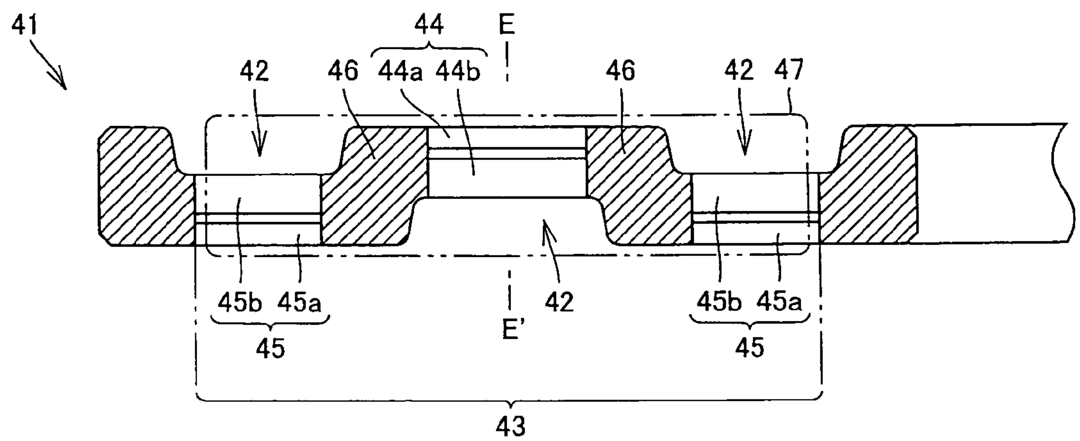
FIG. 13 is a sectional view taken along the line A-A' in FIG. 1 and showing the thrust roller bearing cage according to another embodiment of the present invention.

The roller contact parts 44 and 45 are adjacently provided in a direction of the bearing rotation axis and in a direction of a roller rotation axis. According to the embodiment, as shown in FIG. 13, the first roller contact part 44 is provided at a central upper part of the pocket 43 and the second roller contact parts 45 are provided at lower both ends of the pocket 43.

Figure 14:
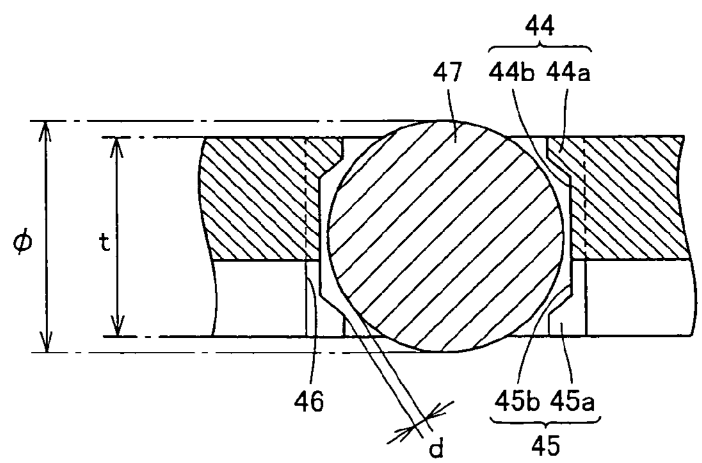
FIG. 14 is a view corresponding to the sectional view taken along line E-E' in FIG. 13 and showing a thrust roller bearing cage according to another embodiment of the present invention.

In addition, as shown in FIG. 14, the first roller contact part 44 comprises a first roller stopper 44*a* to prevent the roller 47 from escaping upward and a first roller guide surface 44*b* to guide the rotation of the roller 47 on its processed surface, and the second roller contact part 45 comprises a second roller stopper 45*a* to prevent the roller 47 from escaping downward and a second guide surface 45*b* to guide the rotation of the roller 47 on its processed surface.

According to the cage having the above constitution, a plate thickness "t" can be as thick as a thickness of the cage 41. As a result, the cage 41 can be considerably strong as compared with the conventional cage. In addition, since a size of the roller stoppers 44*a* and 45*a* is regardless of the plate thickness "t" of the cage 41 and play "d" between the roller 47 and the roller stoppers 44*a* and 45*a* can be an appropriate value, a lubrication property of the thrust roller bearing can be prevented from being lowered.

A relation between the plate thickness "t" of the cage and a roller diameter "$\phi$" of the roller 47 is such that $t/\phi \geqq 0.6$ and $\phi \geqq 2$ mm. When the plate thickness "t" of the cage 41 is reduced, the play "d" between the roller 47 and the roller contact parts 44 and 45 is reduced, so that the lubrication oil on the outer periphery of the roller 47 is scraped off by the roller contact parts 44 and 45 and a rotation defect could be generated. Thus, when the relation between the plate thickness "t" of the cage and the roller diameter "$\phi$" of the roller 47 is set such that $t/\phi \geqq 0.6$ in a case of a thrust roller bearing having a roller diameter "$\phi$" of 2 mm or less, the above problem can be avoided.

In addition, since the processed surfaces of the roller contact parts 44 and 45 serve as the roller guide surfaces 44*b* and 45*b*, a cut surface part provided at the time of die-cutting, which has been used for the roller guide surface conventionally, can be used for the non-contact part 46.

Since the non-contact part 46 can largely retreat from the roller guide surfaces 44*b* and 45*b*, a distance between the non-contact part 46 and the roller 47 can be increased as shown in FIG. 12, so that an oil-passing property of the bearing is improved and the thrust roller bearing has a high lubrication property.

Since the ring-shaped groove 42 of the cage 41 is formed by coining or another cold forging, its strength is great and it is hardly deformed due to processing or heat treatment. In addition, even when it is deformed, it can be corrected by press tempering.

The cage according to the above each embodiment is completed through a heat treatment such as carburized quenching and annealing, or carburized nitriding or soft nitriding instead.

Although the thrust roller bearing comprising the rollers and the cage has been illustrated in the above embodiments, the present invention is not limited to this, and the thrust roller bearing may further comprises a bearing ring.

Next, procedures for forming the second roller stopper 14*a* and the second roller guide surface 14*b* in the second roller contact part shown in FIG. 8 will be described with reference to FIG. 15.

Figure 15A:
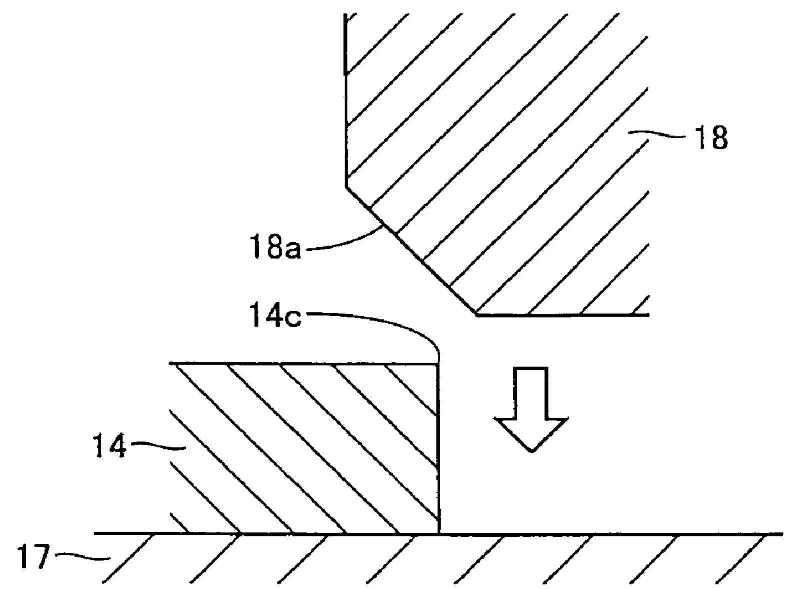
FIG. 15A is a schematic sectional view showing a state before the roller stopper and the roller guide surface are formed by surface pressing.

The second roller stopper 14*a* and the second roller guide surface 14*b* shown in FIG. 8 are formed by surface pressing as shown in FIG. 15. More specifically, as shown in FIG. 15A, the second roller contact part 14 is set on a process board 17 and a tapered surface 18*a* of a tool 18 is pressed to a corner 14*c* of the second roller contact part 14.

Figure 15B:
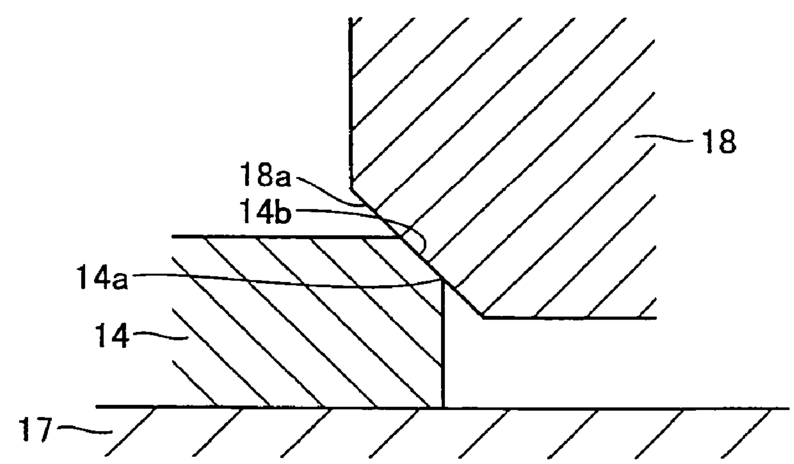
FIG. 15B is a schematic sectional view showing a state after the roller stopper and the roller guide surface are formed by surface pressing.

Thus, as shown in FIG. 15B, the second roller guide surface 14*b* and the second roller stopper 14*a* are formed in its processed surface.

Since the surface pressing is a pressing process unlike shearing, the second roller guide surface 14*b* is smooth, so that contact resistance between the guide surface and the roller can be lowered and iron powder due to abrasion can be prevented from being generated. In addition, an oil film is not cut even under severe lubrication circumstances and a high lubrication property can be maintained. As a result, the thrust roller bearing can provide excellent durability and a quiet property.

Figure 16A:
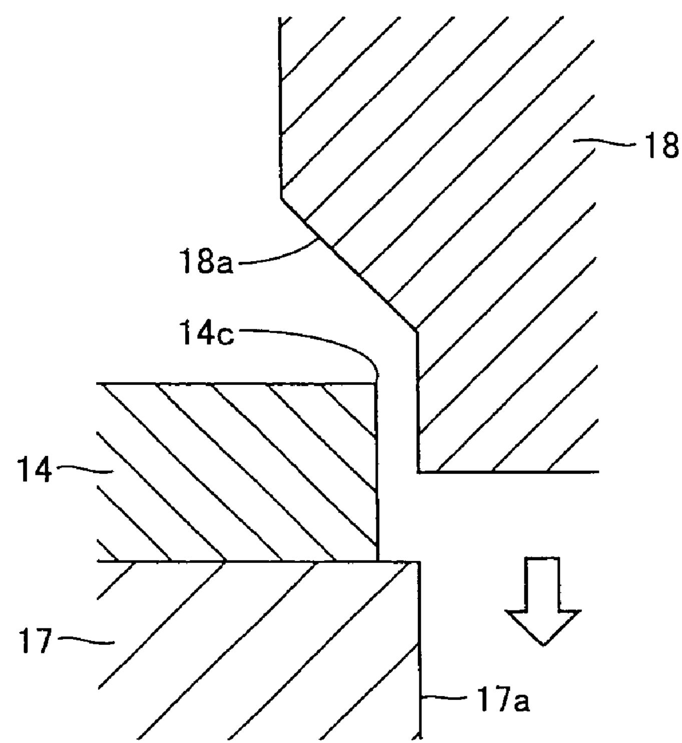
FIG. 16A is a view showing a state before the roller stopper and the roller guide surface are formed by surface pressing in which a tool is more deeply inserted as compared with FIG. 15A.
Figure 16B:
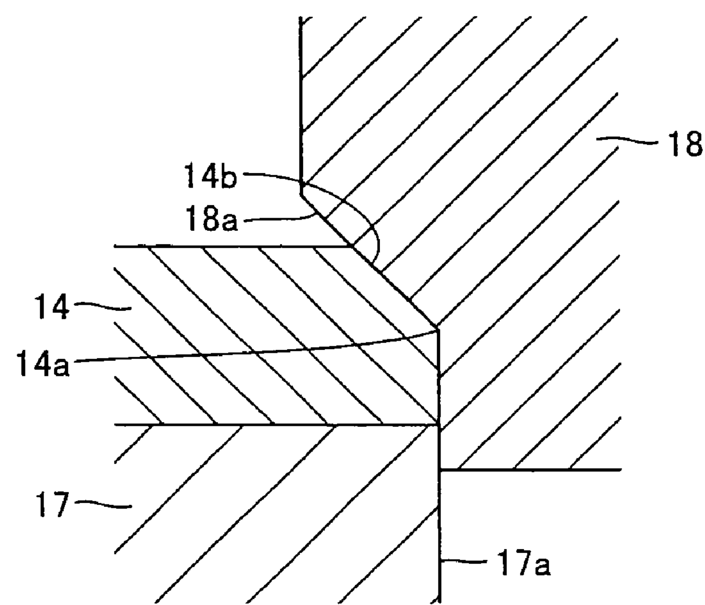
FIG. 16B is a schematic sectional view showing a state after the roller stopper and the roller guide surface are formed by surface pressing.

In addition, when the tool 18 is deeply inserted to form a large roller guide surface, as shown in FIG. 16A, a guide part 17*a* to guide an end of the tool 18 is provided in the process board 17, so that the roller guide surface 14*b* can be largely formed as shown in FIG. 16B.

Although the procedures to form the tapered surface of the second roller guide surface 14*b* as shown in FIG. 8 have been described in the above embodiment, when the tapered surface 18*a* of the tool 18 is curved outward, the curved roller guide surfaces 23*b* and 24*b* shown in FIG. 9 can be formed.

In addition, although the method of forming the second roller stopper 14*a* and the second roller guide surface 14*b* in the second roller contact part 14 has been described in the above embodiment, the first roller stopper 13*a* and the first roller guide surface 13*b* can be formed in the first roller contact part 13 by applying the tool 18 from beneath by the same method.

Furthermore, the roller stoppers 44*a* and 45*a* and the roller guide surfaces 44*b* and 45*b* can be formed in the roller contact parts 44 and 45 of the cage 41, respectively by the same method.

Next, procedures to form the second roller stopper 34*a* and the second roller guide surface 34*b* in the second roller contact part 34 shown in FIG. 10 will be described with reference to FIGS. 17 and 18.

Figure 17A:
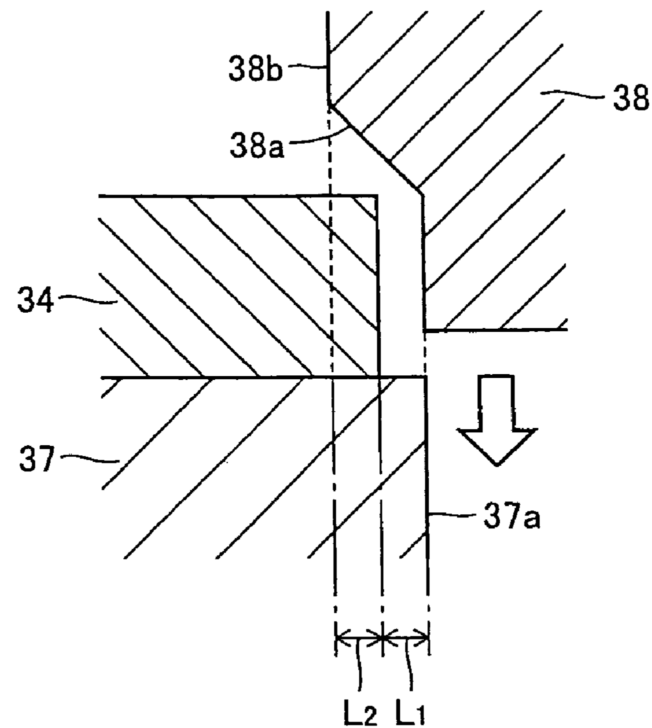
FIG. 17A is a view showing a state before the roller stopper and the roller guide surface are formed by burnishing.
Figure 17B:
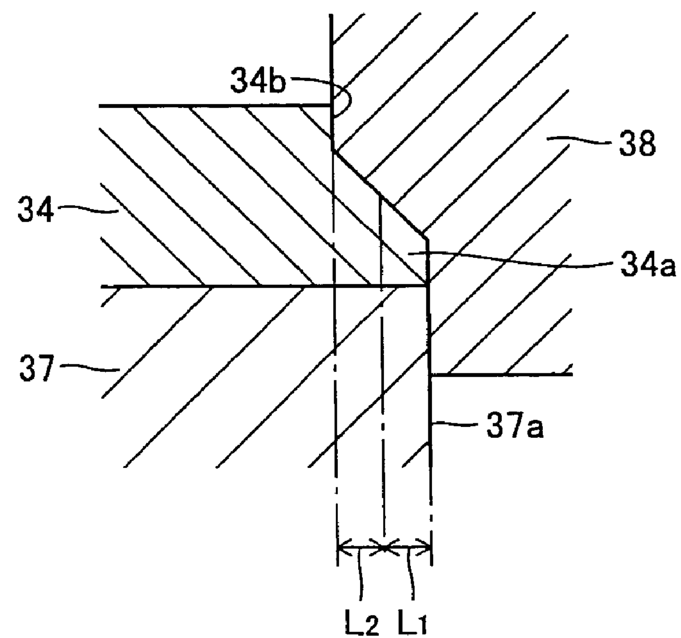
FIG. 17B is a schematic sectional view showing a state after the roller stopper and the roller guide surface are formed by burnishing.

The second roller stopper 34*a* and the second roller guide surface 34*b* are formed by burnishing as shown in FIG. 17. More specifically, as shown in FIG. 17A, the second roller contact part 34 is set on a process board 37 such that it is positioned posterior to an end surface of the process board 37 by a width $L_1$, and a tool 38 is set such that it overlaps with the second roller contact part 34 by a width $L_2$, and processing is performed. Thus, as shown in FIG. 17B, the second roller stopper 34*a* and the roller guide surface 34*b* are formed.

Figure 18:
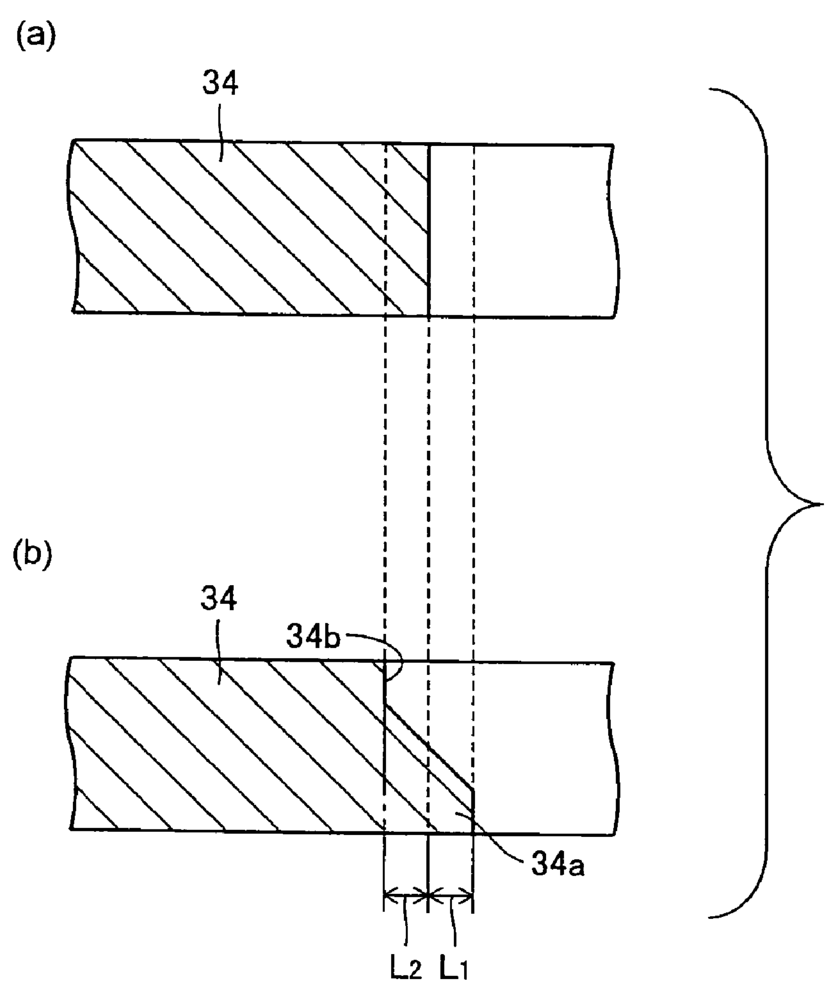
FIG. 18 is an enlarged sectional view showing a roller contact part before and after the roller stopper and the roller guide surface are formed by burnishing.
Figure 19:
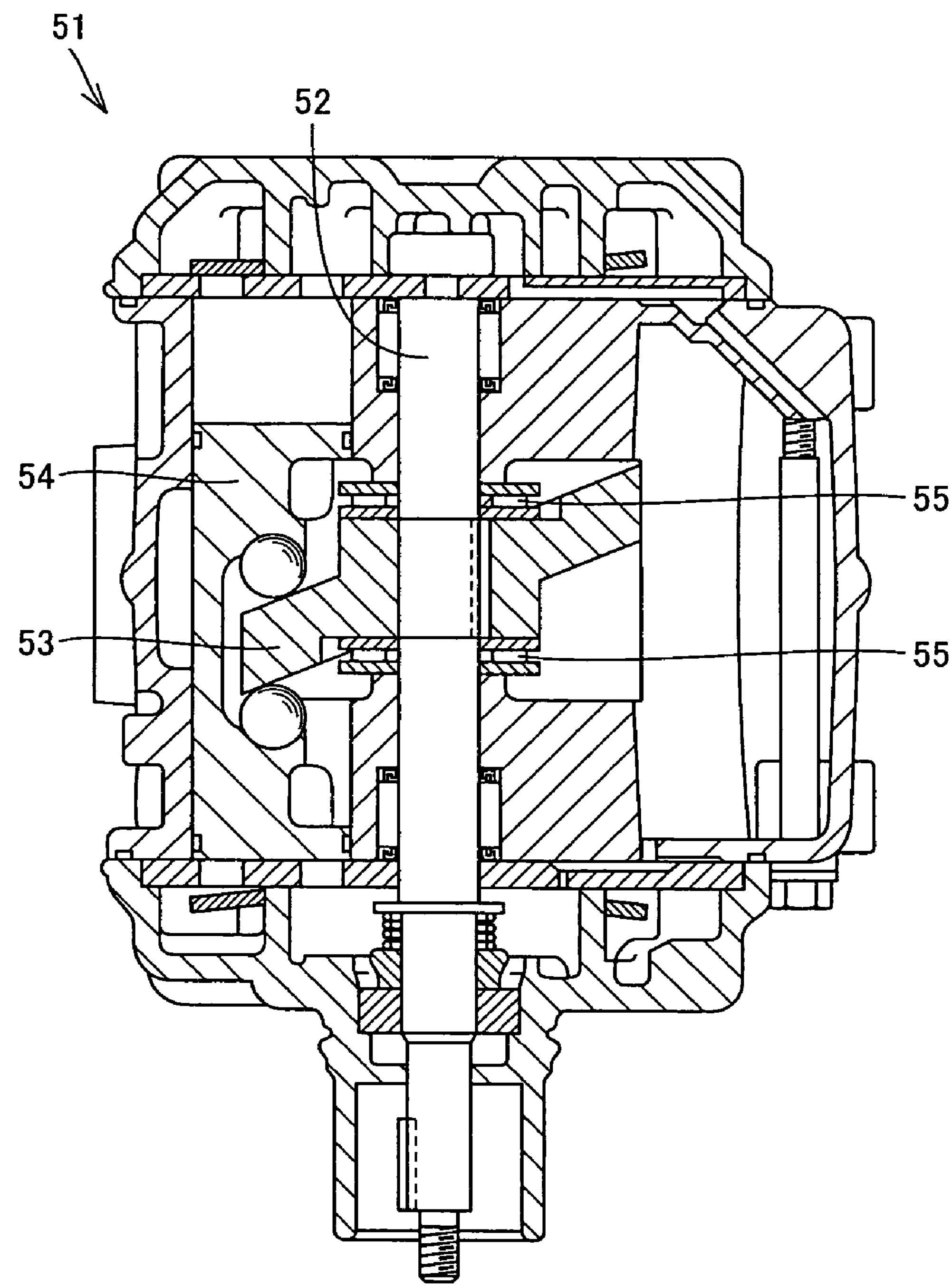
Figure 20:
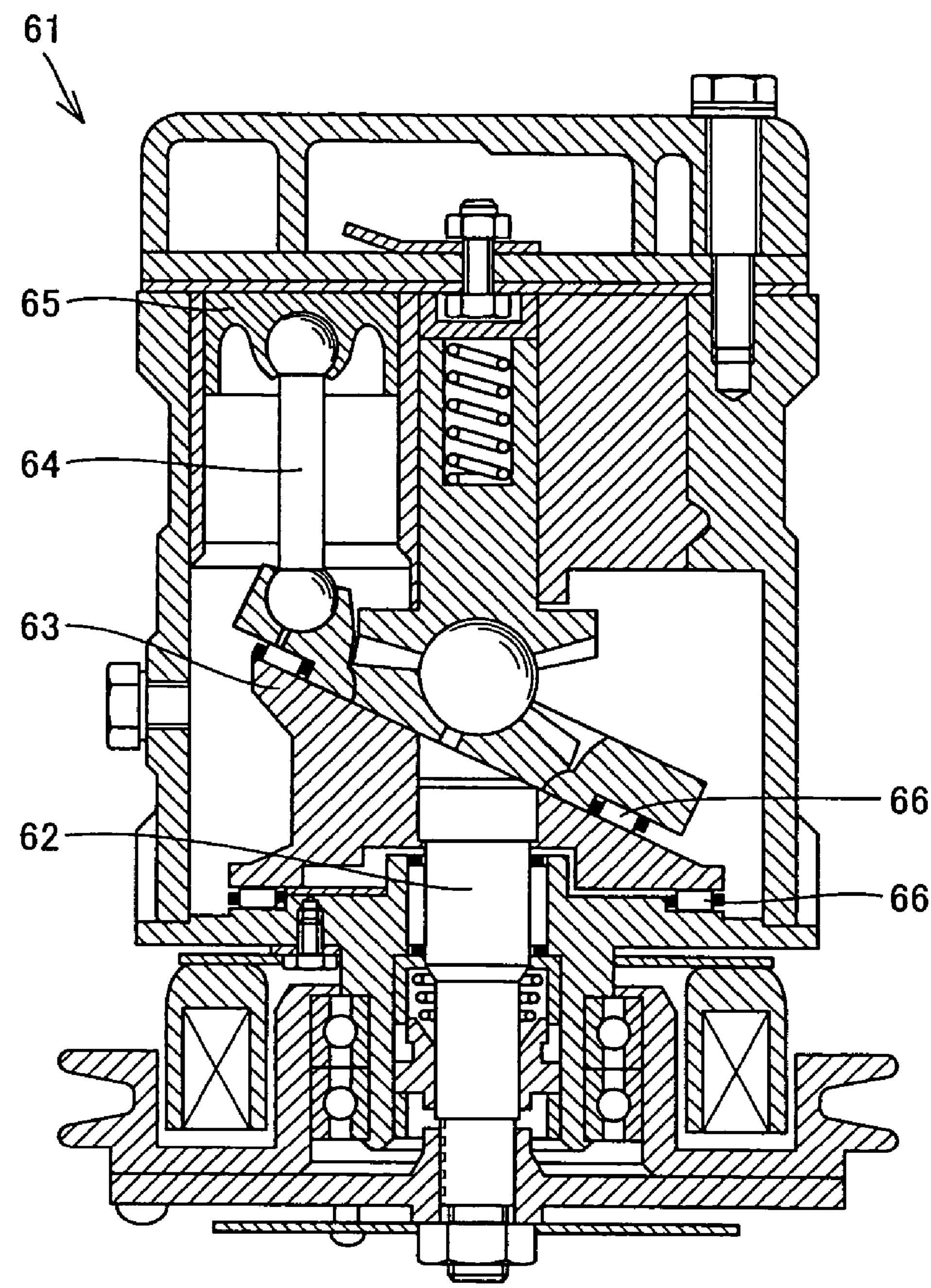
Figure 21:
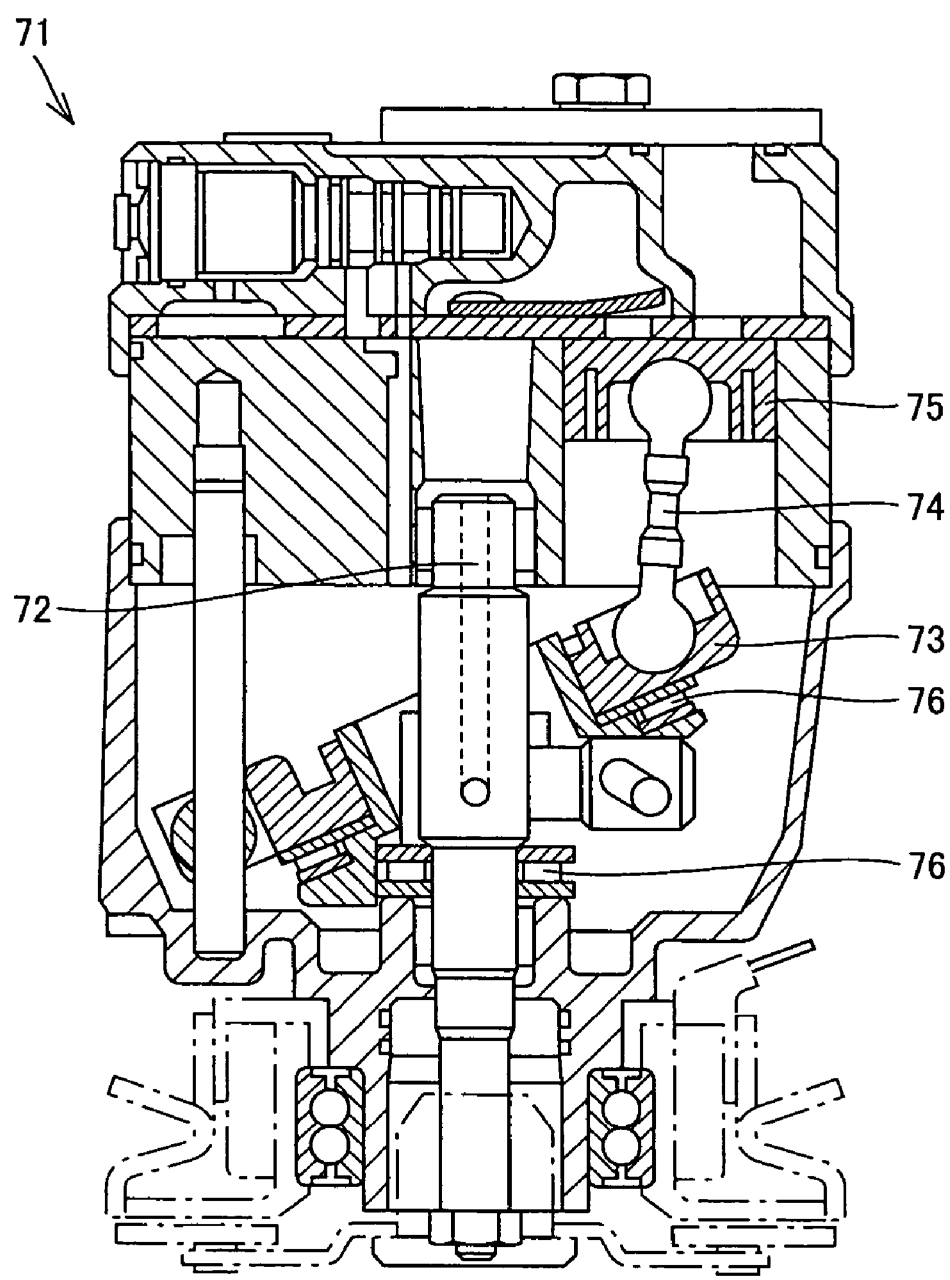
Figure 22:
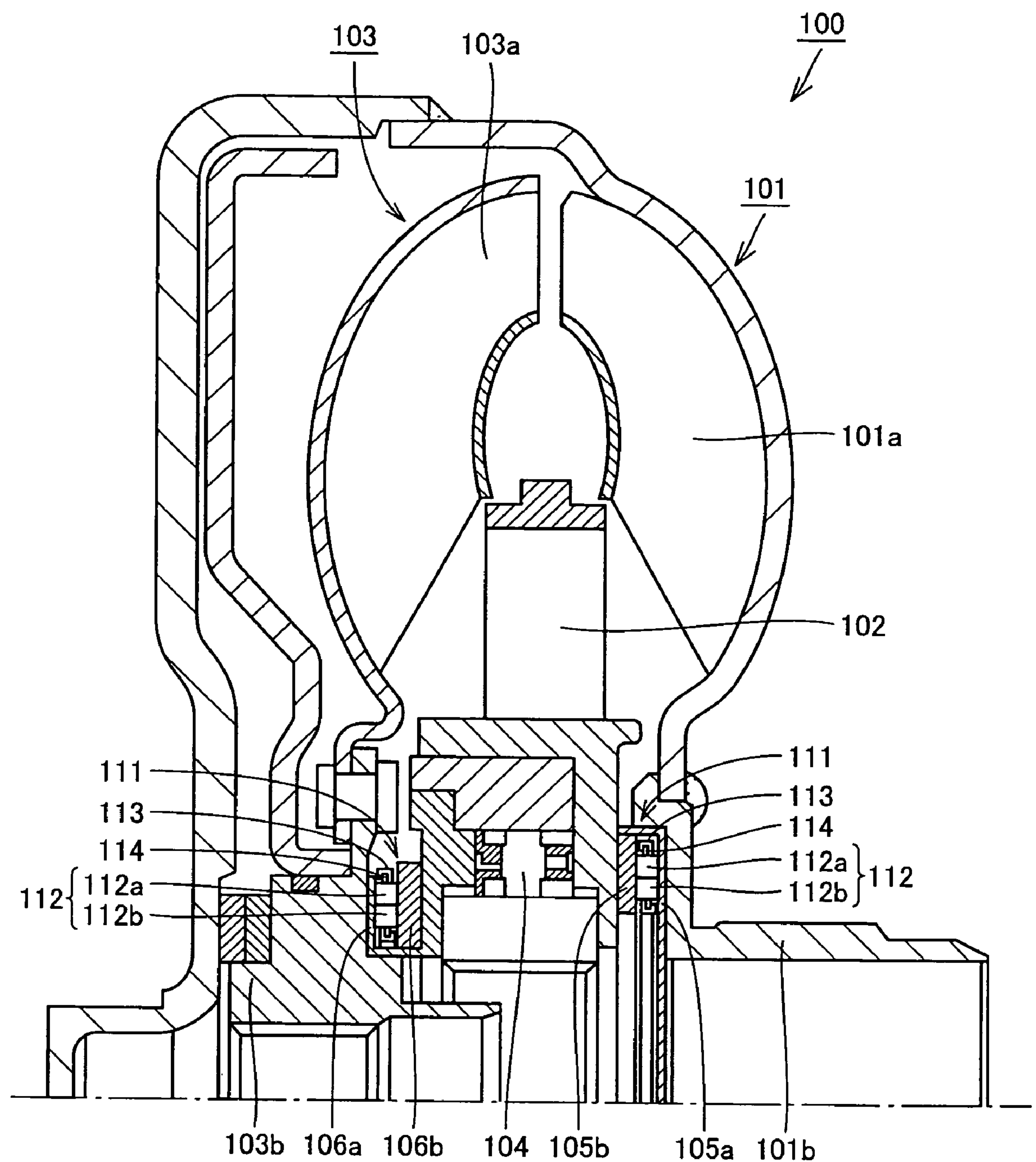
FIG. 22 is a schematic sectional view showing a torque converter of an automatic transmission.
Figure 23:
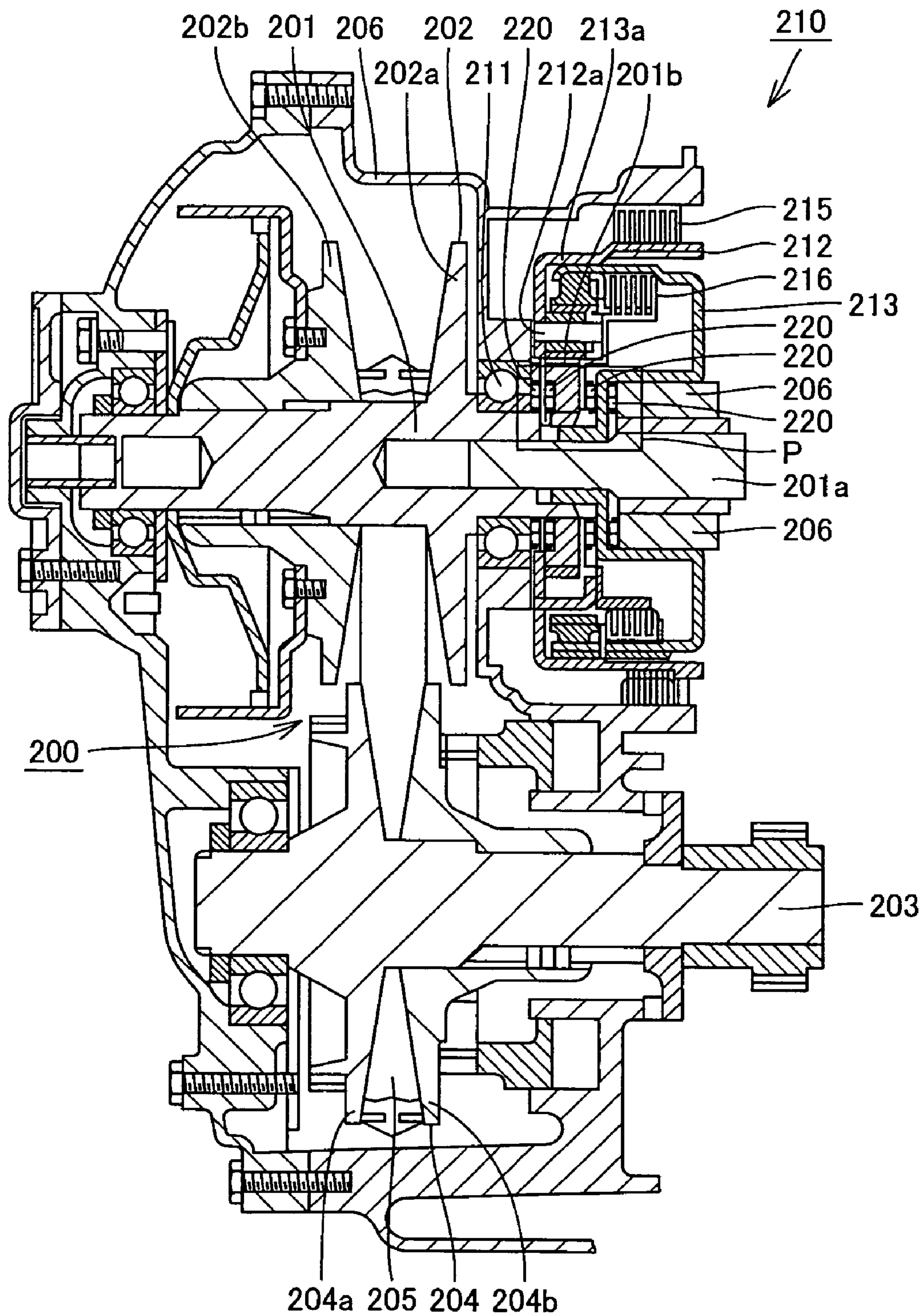
FIG. 23 is a schematic sectional view showing a continuously variable transmission used as a transmission in a car and the like according to one embodiment.
Figure 24:
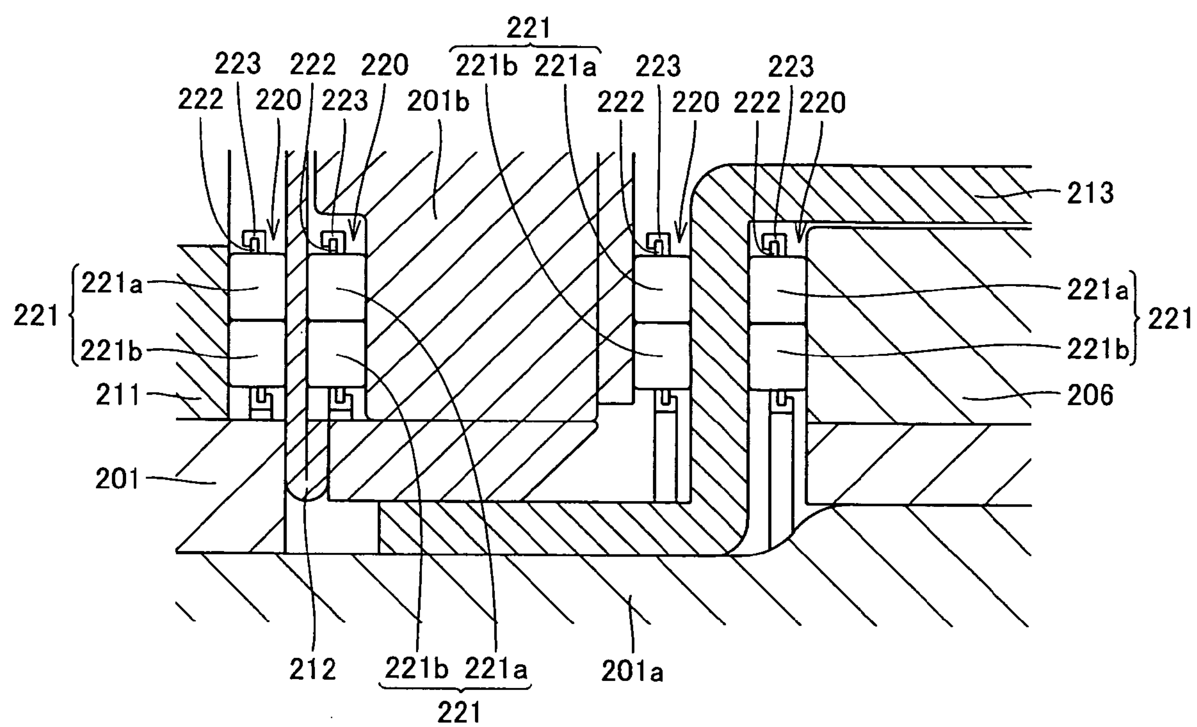
FIG. 24 is an enlarged view of a part P in FIG. 23.

According to the processed second roller contact part 34, as shown in FIG. 18, the second roller guide surface 34*b* retreats from the end surface of the second roller contact part 34 before processed by the width $L_2$, and the second roller stopper 34*a* protrudes from the end surface of the second roller contact part 34 before processed by the width $L_1$ by burnishing.

As described above, since the second roller guide surface 34*b* is formed by burnishing, so that the roller guide surface has low surface roughness and contact resistance between the guide surface and the roller can be lowered and iron powder due to abrasion can be prevented from being generated. In addition, an oil film is not cut even under severe lubrication circumstances and a high lubrication property can be maintained. As a result, the thrust roller bearing can provide excellent durability and a quiet property.

In addition, when the widths $L_1$ and $L_2$ are changed, the play between the roller and the roller contact part can be easily adjusted.

Although the second roller stopper 34*a* and the second roller guide surface 34*b* are formed by burnishing in the above embodiment, the present invention is not limited to this, and ironing or crushing may be used.

In addition, although the method of forming the second roller stopper 34*a* and the second roller guide surface 34*b* in the second roller contact part 34 of the cage shown in FIG. 10 has been described, the first roller stopper 33*a* and the first roller guide surface 33*b* can be formed in the first roller contact part 33 by applying the tool 38 from beneath by the same method.

Still furthermore, the roller stoppers 44*a* and 45*a* and the roller guide surfaces 44*b* and 45*b* can be formed in the roller contact parts 44 and 45 of the cage 41, respectively by the same method.

Although the roller stopper is formed by the surface pressing or burnishing in the above embodiments, the present invention is not limited to this and the corner of the roller contact part may be used as the roller stopper.

In addition, although the surface provided by surface pressing or burnishing serves as the roller guide surface in the above embodiment, the present invention is not limited to this, and the roller non-contact part may be used as the roller guide surface.

The present invention is advantageously applied to the thrust roller bearing used in the automatic transmission or the compressor and the like. In addition, the present invention can be advantageously used for the supporting structure which receives thrust load of a compressor used in a car air-conditioner and the like, for the supporting structure which receives thrust load of an automatic transmission used in a car and the like, or for the supporting structure which receives thrust load of a continuously variable transmission used as a transmission in a car and the like.

Although the embodiments of the present invention have been described with reference to the drawings in the above, the present invention is not limited to the above-illustrated embodiments. Various kinds of modifications and variations may be added to the illustrated embodiments within the same or equal scope of the present invention.

What is claimed is:

1. A thrust roller bearing comprising rollers and a cage, the cage comprising an annular configuration having one surface and another surface parallel to each other and extending over a plane which intersects a bearing rotation axis, the cage having a plurality of pockets to house said rollers on surfaces which intersect with the bearing rotation axis, wherein a first thickness is defined between the one surface and the other surface parallel to each other, the first thickness being equal to a plate thickness "t" of a plate member forming the cage, the cage further comprising an utmost peripheral region, an inmost peripheral region, a first groove forming region adjacent to the utmost peripheral region and a second groove forming region adjacent to the first groove forming region, the utmost peripheral region and the inmost peripheral region each having the first thickness defined by the one surface and the other surface, the first groove forming region having a first ring-shaped groove extending in a circle and recessed on the one surface, a thickness defined between the bottom surface of the first ring-shaped groove and the other surface being smaller than the first thickness, the second groove forming region having a second ring-shaped groove extending in a circle and recessed on the other surface, a thickness defined between the bottom surface of the second ring-shaped groove and the one surface being smaller than the first thickness, and a first roller contact part is positioned in the first groove forming region and a second roller contact part is positioned in the second groove forming region, the first roller contact part and the second roller contact part are provided on a wall surface of said pocket opposed to an outer periphery of said roller so as to be positioned in a direction of said bearing rotation axis and in a direction of a rotation axis of said roller, said first roller contact part comprises a first roller stopper to prevent said roller from escaping in one direction and a first roller guide surface to guide a rotation of said roller, and said second roller contact part comprises a second roller stopper to prevent said roller from escaping in the other direction and a second roller guide surface to guide the rotation of said roller, wherein a relation between the plate thickness "t" of said cage and a roller diameter "$\phi$" is such that $t/\phi \geqq 0.6$, and said roller diameter "$\phi$" is not more than 2 mm.

2. The thrust roller bearing according to claim 1, wherein said roller stopper and said roller guide surface of each roller contact part are formed by burnishing.

3. The thrust roller bearing according to claim 1, wherein said ring-shaped grooves of the cage are formed by coining.

4. The thrust roller bearing according to claim 1, comprising a non-contact part retreating from said roller guide surface, between said first roller contact part and said second roller contact part.

* * * * *